United States Patent
Bacha

(10) Patent No.: US 11,526,565 B2
(45) Date of Patent: Dec. 13, 2022

(54) METHOD OF AND SYSTEM FOR CLUSTERING SEARCH QUERIES

(71) Applicant: OVH, Roubaix (FR)

(72) Inventor: Remi Bacha, La Madeleine (FR)

(73) Assignee: OVH, Roubaix (FR)

( * ) Notice: Subject to any disclaimer, the term of this patent is extended or adjusted under 35 U.S.C. 154(b) by 241 days.

(21) Appl. No.: 16/518,170

(22) Filed: Jul. 22, 2019

(65) Prior Publication Data

US 2020/0320147 A1    Oct. 8, 2020

(30) Foreign Application Priority Data

Apr. 5, 2019 (EP) .................................... 19315021

(51) Int. Cl.
  *G06F 16/953* (2019.01)
  *G06F 16/2457* (2019.01)
  *G06F 16/28* (2019.01)

(52) U.S. Cl.
  CPC ...... *G06F 16/953* (2019.01); *G06F 16/24578* (2019.01); *G06F 16/285* (2019.01)

(58) Field of Classification Search
  CPC . G06F 16/953; G06F 16/285; G06F 16/24578
  USPC ....................................................... 707/706
  See application file for complete search history.

(56) References Cited

U.S. PATENT DOCUMENTS

| | | | |
|---|---|---|---|
| 5,864,846 A * | 1/1999 | Voorhees | G06F 16/951 707/999.005 |
| 6,370,582 B1 | 4/2002 | Lim et al. | |
| 6,633,906 B1 | 10/2003 | Callaway et al. | |
| 6,968,370 B2 | 11/2005 | Wu | |
| 7,693,813 B1 | 4/2010 | Cao et al. | |
| 8,352,465 B1 * | 1/2013 | Jing | G06F 16/583 707/723 |

(Continued)

FOREIGN PATENT DOCUMENTS

| | | |
|---|---|---|
| JP | H06266666 A | 9/1994 |
| WO | 2002/033553 A1 | 4/2002 |

OTHER PUBLICATIONS

Schwartz, "Google reaffirms 15% of searches are new, never been searched before", 2017, https://searchengineland.com/google-reaffirms-15-searches-new-never-searched-273786, pdf document, 4 pages.

(Continued)

*Primary Examiner* — Mark E Hershley
(74) *Attorney, Agent, or Firm* — BCF LLP

(57) ABSTRACT

A method of and a system for clustering search queries. The method comprising accessing a list of search queries, each search query of the list of search queries comprising one or more keywords and, for each search query of the list of search queries, submitting the search query to a search engine; receiving a search engine result page (SERP) from the search engine; extracting a plurality of information elements from the SERP and populating a content matrix with the information elements extracted from the SERP. The method may further comprises computing, based on the content matrix, a distance matrix comprising similarity scores measuring similarities between each search query of the list of search queries and clustering, based on the distance matrix, the search queries of the list of search queries.

20 Claims, 12 Drawing Sheets

(56) References Cited

U.S. PATENT DOCUMENTS

| | | | |
|---|---|---|---|
| 8,438,163 B1* | 5/2013 | Li | G06V 30/242 707/706 |
| 8,849,812 B1 | 9/2014 | Mukherjee et al. | |
| 9,262,145 B2 | 2/2016 | Grimme et al. | |
| 9,336,302 B1* | 5/2016 | Swamy | G06F 16/285 |
| 9,589,053 B1 | 3/2017 | Augustine et al. | |
| 9,792,629 B2 | 10/2017 | Rao et al. | |
| 10,089,387 B1 | 10/2018 | Hoyne et al. | |
| 10,585,927 B1* | 3/2020 | Liao | G06F 16/338 |
| 10,685,044 B2 | 6/2020 | Miranda et al. | |
| 10,740,338 B2* | 8/2020 | Roitman | G06N 5/04 |
| 11,080,336 B2* | 8/2021 | Van Dusen | G06Q 50/01 |
| 2003/0018539 A1 | 1/2003 | La Poutre et al. | |
| 2004/0236737 A1 | 11/2004 | Weissman et al. | |
| 2005/0278723 A1 | 12/2005 | Feinleib et al. | |
| 2006/0122965 A1* | 6/2006 | Adams | G06F 16/24 |
| 2008/0077570 A1* | 3/2008 | Tang | G06F 16/951 707/999.005 |
| 2008/0114721 A1* | 5/2008 | Jones | G06F 16/3338 |
| 2008/0196043 A1 | 8/2008 | Feinleib et al. | |
| 2009/0138445 A1* | 5/2009 | White | G06Q 30/02 |
| 2009/0204910 A1 | 8/2009 | Zhang | |
| 2009/0299998 A1 | 12/2009 | Kim | |
| 2010/0114929 A1* | 5/2010 | Bonchi | G06F 16/3322 707/E17.014 |
| 2010/0169340 A1* | 7/2010 | Kenedy | G06Q 30/02 707/758 |
| 2010/0169343 A1* | 7/2010 | Kenedy | G06F 16/285 707/758 |
| 2010/0198823 A1* | 8/2010 | Tsoukalas | G06F 16/35 709/219 |
| 2010/0281173 A1 | 11/2010 | Vutukuri et al. | |
| 2010/0306249 A1* | 12/2010 | Hill | G06F 16/9535 707/769 |
| 2012/0158685 A1* | 6/2012 | White | G06F 16/9535 707/723 |
| 2012/0185466 A1 | 7/2012 | Yamasaki et al. | |
| 2012/0278321 A1* | 11/2012 | Traub | G06F 16/3331 707/E17.014 |
| 2013/0191213 A1* | 7/2013 | Beck | G06Q 30/0207 705/14.64 |
| 2013/0311271 A1* | 11/2013 | Agrawal | G06Q 30/02 705/14.71 |
| 2014/0012841 A1 | 1/2014 | Will et al. | |
| 2014/0032567 A1* | 1/2014 | Assadollahi | G06F 16/3347 707/742 |
| 2014/0082602 A1 | 3/2014 | Mallur et al. | |
| 2014/0180815 A1* | 6/2014 | Chatwin | G06Q 30/0275 705/14.54 |
| 2014/0201126 A1* | 7/2014 | Zadeh | A61B 5/165 706/52 |
| 2015/0206070 A1* | 7/2015 | Kulkarni | G06F 16/24578 706/12 |
| 2015/0379012 A1* | 12/2015 | Awadallah | G06F 16/9535 707/706 |
| 2016/0026720 A1 | 1/2016 | Lehrer et al. | |
| 2016/0103897 A1* | 4/2016 | Nysewander | G06F 16/254 707/602 |
| 2016/0350294 A1* | 12/2016 | Nefedov | G06F 16/367 |
| 2018/0025303 A1* | 1/2018 | Janz | G16H 50/20 705/2 |
| 2018/0081874 A1* | 3/2018 | Zelenkov | G06F 40/284 |
| 2018/0113888 A1* | 4/2018 | Pena | G06F 16/907 |
| 2018/0204111 A1* | 7/2018 | Zadeh | G06N 3/0436 |
| 2018/0285458 A1* | 10/2018 | Khalkechev | G06F 16/248 |
| 2019/0005049 A1* | 1/2019 | Mittal | G06F 16/316 |
| 2019/0205385 A1* | 7/2019 | Gusakov | G06F 16/93 |
| 2019/0391982 A1* | 12/2019 | Duzhik | G06N 20/20 |

OTHER PUBLICATIONS

Dick "Search engine optimisation in UK news production", Journalism Practice, 2011, vol. 5, No. 4, pp. 462-477.

Giomelakis et al., "Employing search engine optimization techniques in online news articles. Studies in Media and Communication", 2015, vol. 3, No. 1, pp. 22-33.

Giomelakis et al., "Investigating search engine optimization factors in media websites: the case of Greece", Digital Journalism, 2016, vol. 4, No. 3, pp. 379-400.

Codina et al., "Search engine optimization and online journalism: the SEO-WCP framework", 2016, 21 pages.

"Running PowerShell commands from Linux", Aaron's Code Notes, retrieved on http://sharpcodenotes.blogspot.com/2014/01/running-powershell-commands-from-linux html on Jul. 19, 2019, 2 pages.

Yunus, "Executing Powershell script on Win2012 R2 Server from Linux using SaltStack", retrieved on https://www.youtube.com/watch?v=miK25mDV9ik&feature=youtu.be on Jul. 19, 2019, 1 page.

"How can I connect to a Windows server using a Command Line Interface? (CLI)", ServerFault, retrieved on https://serverfault.com/questions/429426/how-can-i-connect-to-a-windows-server-using-a-command-line-interface-cli on Jul. 19, 2019, 6 pages.

Snover, "PowerShell is open sourced and is available on Linux", retrieved on https://azure.microsoft.com/en-us on Mar. 16, 2018, 6 pages.

Qasha, "Developing Multi-platform package for Remote System Administration", (IJCSIS) International Journal of Computer Science and Information Security, vol. 10, No. 3, 2012, pp. 72-76.

"PowerShell Server", Software, retrieved on https://www.nsoftware.com/powershell/server/ on Mar. 16, 2018, 6 pages.

English Abstract for JPH06266666 retrieved on Espacenet on Jul. 19, 2019.

Office Action with regard to the counterpart U.S. Appl. No. 16/030,445 dated Jun. 29, 2020.

Notice of Allowance with regard to the counterpart U.S. Appl. No. 16/030,445 dated Oct. 15, 2020.

* cited by examiner

- List of search queries
- Similarity % for grouping search queries

- Clusters of search queries
- Similarity scores

METHOD OF AND SYSTEM FOR CLUSTERING SEARCH QUERIES

CROSS-REFERENCE

The present application claims priority from European Patent Applications no 19315021.6 which was filed on Apr. 5, 2019, the disclosures of which is incorporated by reference herein in their entirety.

FIELD

The present technology relates to the field of Internet searches. In particular, the present technology introduces a method of and a system for clustering search queries.

BACKGROUND

Search engines such as Google™, Bing™, Yahoo!™ and the like assign ranks to search request results and the owner of a web site will normally desire his/her web site to have the highest possible ranking. Search engine optimization (SEO) is a technique used to augment the visibility of a web site to users of search engines. SEO allows a web site to obtain high ranks in search results, in turn increasing the traffic generated on the web site with the ultimate goal of increasing revenues for the web site owner.

Proper optimization using SEO requires a lot of attention to the content of a web site. Preparing a sound content strategy for a web site is a time-consuming task, usually requiring several days of work for a single site.

A first problem with manual preparation of a content strategy lies in the high rate of change of information in Internet web sites and of their referencing in search engines. For example, Google™ has recently stated that 15% of searches done on a daily basis have never been seen before. Information stored on web sites worldwide changes everyday. Search engines routinely scan through web sites all over the world on a continuous basis, using a process called web crawling. New web sites and new web pages are repetitively visited by web crawlers on a daily basis and new or modified keywords are constantly added in the databases of search engines. Web site owners using a manual approach to define their content strategy based on a collection of keywords are constantly running late and cannot possibly keep up with new keywords added everyday.

A second problem with manual preparation of a content strategy lies in the preparation of lists of keywords used by Internet users of search engines when specifying their search queries. A size of such lists of keywords may reach hundreds or even thousands of keywords which need to be filtered and clustered into a plurality of thematic. Each thematic may then be considered as to be integrated into a website as part of a content strategy, for example as a dedicated webpage.

Up until recently, search queries could be processed differently by search engines even though such search queries were relating to a same intent. As an example, a search query "vps" could have returned totally different results than a search query "virtual private server" as their syntax was different. Recent developments in search engine technologies have addressed this issue and search engines such as Google™ now return similar search result pages for the search query "vps" and the search query "virtual private server" based on a determination that both search queries define a common intent. SEO strategies would benefit from understanding the intents of Internet users hidden behind search queries and identification of relevant thematic.

Even though the recent developments identified above may provide benefits, improvements are still desirable.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches.

SUMMARY

Embodiments of the present technology have been developed based on developers' appreciation of shortcomings associated with the prior art.

In particular, such shortcomings may comprise the lack of search engine optimization (SEO) techniques able to properly analyse and cluster search queries based on the intents of Internet users while ensuring that the most recent search results are integrated into the analysing and clustering of the search queries.

In one aspect, various implementations of the present technology provide a method for clustering search queries, the method comprising:
accessing a list of search queries, each search query of the list of search queries comprising one or more keywords;
for each search query of the list of search queries:
    submitting the search query to a search engine;
    receiving a search engine result page (SERP) from the search engine;
    extracting a plurality of information elements from the SERP;
    populating a content matrix with the information elements extracted from the SERP;
computing, based on the content matrix, a distance matrix comprising similarity scores measuring similarities between each search query of the list of search queries; and
clustering, based on the distance matrix, the search queries of the list of search queries.

In some other aspects, various implementations of the present technology provide a system, the system comprising:
a communication module configured to communicate with a search engine over the Internet;
an operator interface;
a memory device comprising computer-readable instructions; and
a processor operatively connected to the communication module, the operator interface, and the memory device, the processor, upon execution of the computer-readable instructions, causing:
    accessing a list of search queries, each search query of the list of search queries comprising one or more keywords;
    for each search query of the list of search queries:
        submitting the search query to a search engine;
        receiving a search engine result page (SERP) from the search engine;
        extracting a plurality of information elements from the SERP;
        populating a content matrix with the information elements extracted from the SERP;
    computing, based on the content matrix, a distance matrix comprising similarity scores measuring similarities between each search query of the list of search queries; and
clustering, based on the distance matrix, the search queries of the list of search queries.

In yet some other aspects, various implementation of the present technology provide non-transitory computer readable medium for storing computer-executable instructions that, when executed, cause a computer system to perform a computer-implemented method comprising:

accessing a list of search queries, each search query of the list of search queries comprising one or more keywords;

for each search query of the list of search queries:
submitting the search query to a search engine;
receiving a search engine result page (SERP) from the search engine;
extracting a plurality of information elements from the SERP;
populating a content matrix with the information elements extracted from the SERP;

computing, based on the content matrix, a distance matrix comprising similarity scores measuring similarities between each search query of the list of search queries; and clustering, based on the distance matrix, the search queries of the list of search queries.

In the context of the present specification, unless expressly provided otherwise, a computer system may refer, but is not limited to, an 'electronic device', an 'operation system', a 'system', a 'computer-based system', a 'controller unit', a 'monitoring device', a 'control device' and/or any combination thereof appropriate to the relevant task at hand.

In the context of the present specification, unless expressly provided otherwise, the expression 'computer-readable medium', 'memory' and 'memory device' are intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives. Still in the context of the present specification, 'a' computer-readable medium and 'the' computer-readable medium should not be construed as being the same computer-readable medium. To the contrary, and whenever appropriate, 'a' computer-readable medium and 'the' computer-readable medium may also be construed as a first computer-readable medium and a second computer-readable medium.

In the context of the present specification, unless expressly provided otherwise, the words 'first', 'second', 'third', etc. have been used as adjectives only for the purpose of allowing for distinction between the nouns that they modify from one another, and not for the purpose of describing any particular relationship between those nouns.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIGS. 4a and 4b reproduce a content of a first search engine result page (SERP) for a search query;

FIGS. 5a and 5b reproduce a content of a second search engine result page (SERP) for another search query;

FIG. 7 illustrates a representation of a distance matrix in accordance with an embodiment of the present technology;

Figure 1:
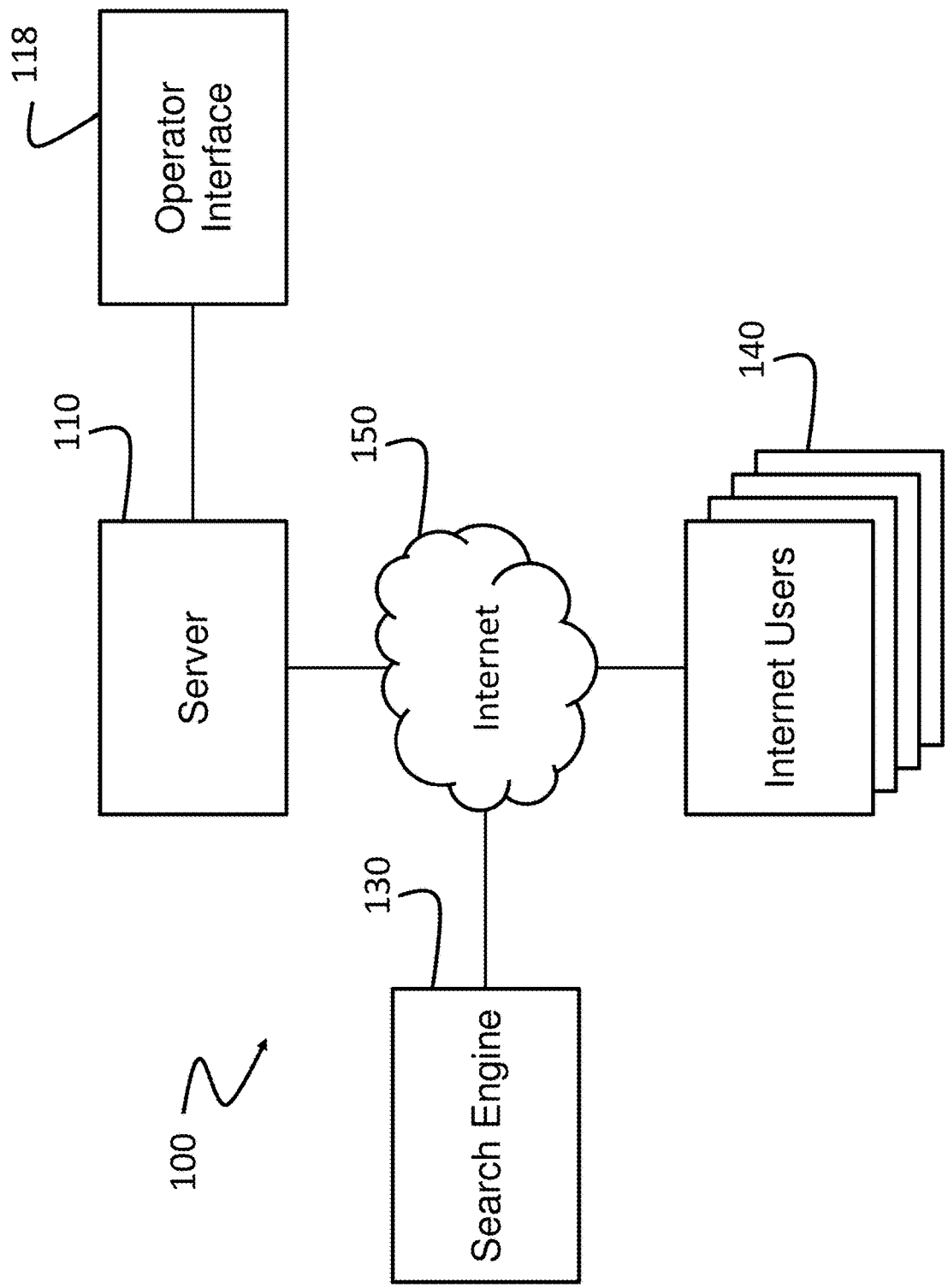
FIG. 1 illustrates a network in accordance with an embodiment of the present technology.

It should also be noted that, unless otherwise explicitly specified herein, the drawings are not to scale.

DETAILED DESCRIPTION

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in non-transitory computer-readable media and so executed by a computer or processor, whether or not such computer or processor is explicitly shown.

The functions of the various elements shown in the figures, including any functional block labeled as a 'processor', may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a digital signal processor (DSP). Moreover, explicit use of the term a 'processor' should not be construed to refer exclusively to hardware capable of executing software, and may implicitly include, without limitation, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown. Moreover, it should be understood that module may include for example, but without being limitative, computer program logic, computer program instructions, software, stack, firmware, hardware circuitry or a combination thereof which provides the required capabilities.

For clarity purposes, the present disclosure uses the terms 'user' and 'Internet user', both in singular and plural forms, to refer to generic users of search engines attempting to find links to web pages of interest. The term 'operator' refers to the persons in charge of defining, modifying, adding and/or deleting contents of a web page, an operator being also called a web designer.

In an aspect, the present technology introduces a method for clustering search queries based on users' intents. An operator in charge of a website and desiring to attract users may start by defining a list of search queries. Each one of the search queries may comprise one or more keywords. The search query may equally be referred to as a search term. The operator may use the method implementing the present technology to cluster the search queries from the list of search queries. In some embodiments, multiple clusters of search queries may be created based on similarities of search result pages (SERP) obtained from a search engine, for example and without limitation Google™, Bing™, Yahoo!™ and the like. In some embodiments, the search engine is selected so as to enable determination of common users' intents from different search queries.

In order to perform clustering of the search queries, information elements are extracted from search result pages (SERP) obtained from the search engine. The information elements are acquired from the SERP after submitting the list of search queries to the search engine. Each search query of the list of search queries is independently submitted to the search engine. A SERP is received for each search query. Various information elements are extracted from each SERP and used to populate a content matrix associating the information elements from the SERP with information categories. The content matrix is then used to compute a distance matrix comprising similarity scores measuring similarities between each search query of the list of search queries. The search queries of the list of search queries are then clustered based on the distance matrix. In some embodiments, the clustering may be further based on a minimum similarity threshold defining a minimum similarity required for search queries to be clustered together. The cluster of search queries may be presented to the operator in different formats, for example, in the form of a cluster dendrogram.

By being able to visualize cluster of similar search queries, the operator may then better determine how keywords may be grouped by common users' intents, establish how keywords may be grouped by thematic, establish which keywords should be grouped in a same webpage and/or establish which groups of keywords may require creation of distinct webpages. In addition, as the clusters of search queries is generated on the basis of information elements extracted from SERP generated upon executing the method, the clustering of search queries is based on the most recent results available from the search engine. This approach thereby allows creation of better optimized webpages and websites increasing the likelihood that the search engine will properly direct to relevant web pages independently of how the search queries may have been specified by the user. This approach may also support defining an SEO strategy which may result in a better ranking of the created web pages and/of websites.

With these fundamentals in place, we will now consider some non-limiting examples to illustrate various implementations of aspects of the present technology.

The following description and some of the drawings will make reference to the Google search engine. The present technology is not limited to this specific search engine; search result pages from other products, for example and without limitation search engines from Bing™, Yahoo™, Ask.com™, AOL.com™, and the like, also provide information that may be used by the present technology.

Some search engines such as Baidu™ and Yandex™ provide their results in languages that do not use the Latin alphabet; the present technology may be adapted to operate with Asian characters or with Cyrillic script.

FIG. 1 illustrates a network in accordance with an embodiment of the present technology. A network 100 includes a server 110 for operating a method of clustering search queries. The server 110 may be connected to an operator interface 118 including for example a computer display with a keyboard and a mouse, a touch sensitive display, and the like, allowing a web site owner to enter information into the server 110 and to receive information from the server 110. The network 100 also includes a search engine 130 and a plurality of Internet users 140, all of which are connected to the server 110 via the Internet 150. The network 100 may include a plurality of servers such as the server 110; however, the description of the present technology will focus on improvements made in the server 110. The network may include a plurality of search engines. A single search engine 130 is illustrated for simplicity purposes and without limiting the generality of the present technology.

Figure 2:
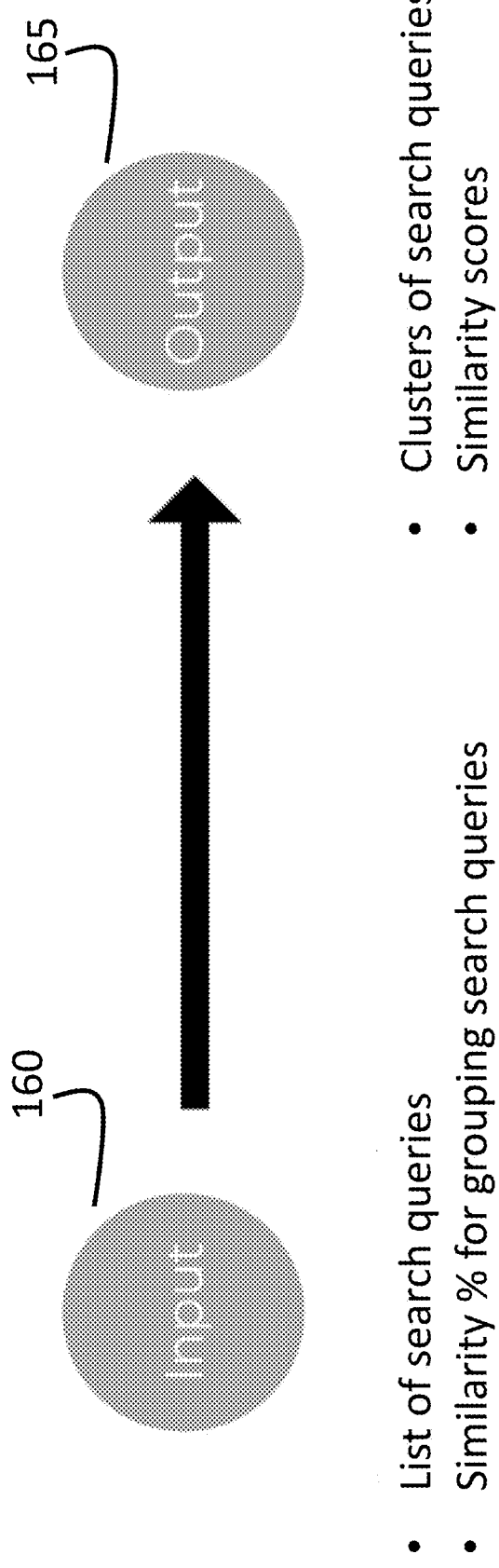
FIGS. 2 and 3 illustrate selected steps of a computer-implemented method in accordance with an embodiment of the present technology.

Turning now to FIG. 2, an operator may provide the server 110 with inputs 160, the server 110 may then return outputs 165 to the operator. In accordance with embodiments of the present technology, the inputs 160 may comprise a list of search queries and/or a similarity percentage for grouping the search queries and the outputs 165 may comprise clusters of search queries and similarity scores.

The similarity percentage for grouping the search queries may also be referred as a minimum similarity threshold and may be implemented as a numerical value, e.g., a value ranging from "0" to "1". In some embodiments, similarity may be determined based on similar information elements being present in distinct SERPs generated from distinct search queries. The more information elements are the same between SERPs, the more the similarity, the closer the numerical value gets to "1". Conversely, the more information elements are different between SERPs, the less the similarity, the closer the numerical value gets to "0". In some embodiments, the minimum similarity threshold may refer to a minimum value that has to be met to establish that similarity exists between SERPs and/or search queries associated with the SERPs. As an example, the minimum similarity threshold may be "0.5", "0.7" or "0.9". The actual value of the minimum similarity threshold may vary and should therefore not be construed as being limitative.

An example of a list of search queries 162 is provided in Table I. In this example, the list of search queries 162 comprises twenty four (24) search queries, each comprising one or more keywords and being associated with a corresponding Uniform Resource Locator (URL).

TABLE I

| ID | Search Query | URL |
|---|---|---|
| 1 | "a quel age est mort steve jobs" | https://www.google.com/search?q=a+quel+age+est+mort+steve+jobs |
| 2 | "quel age avait steve jobs" | https://www.google.com/search?q=quel+age+avait+steve+jobs |
| 3 | "jobs age mort" | https://www.google.com/search?q=jobs+age+mort |
| 4 | "steve jobs age mort" | https://www.google.com/search?q=steve+jobs+age+mort |
| 5 | "houellebecq serotonine" | https://www.google.com/search?q=houellebecq+serotonine |
| 6 | "houellebecq serotonine roman" | https://www.google.com/search?q=houellebecq+serotonine+roman |
| 7 | "michel houellebecq serotonine" | https://www.google.com/search?q=michel+houellebecq+serotonine |
| 8 | "association protection animale tourcoing" | https://www.google.com/search?q=association+protection+animale+tourcoing |
| 9 | "spa tourcoing" | https://www.google.com/search?q=spa+tourcoing |
| 10 | "spa tourcoing place de la croix rouge tourcoing" | https://www.google.com/search?q=spa+tourcoing+place+de+la+croix+rouge+tourcoing |
| 11 | "maison spa 59200" | https://www.google.com/search?q=maison+spa+59200 |
| 12 | "maison spa tourcoing" | https://www.google.com/search?q=maison+spa+tourcoing |
| 13 | « emmaus connect lille lille » | https://www.google.com/search?q=emmaus+connect+lille+lille |
| 14 | « emmaus proche de moi » | https://www.google.com/search?q=emmaus+proche+de+moi |
| 15 | « emmaus lille » | https://www.google.com/search?q=emmaus+lille |
| 16 | « lille emmaus » | https://www.google.com/search?q=lille+emmaus |
| 17 | « cloud storage » | https://www.google.com/search?q=cloud+storage |
| 18 | « cloud » | https://www.google.com/search?q=cloud |
| 19 | « cloud computing » | https://www.google.com/search?q=cloud+computing |
| 20 | « apple watch » | https://www.google.com/search?q=apple+watch |
| 21 | « apple smartwatch » | https://www.google.com/search?q=apple+smartwatch |
| 22 | « apple watch prix » | https://www.google.com/search?q=apple+watch+prix |
| 23 | « cadre numérique » | https://www.google.com/search?q=cadre+numérique |
| 24 | « cadre photo numérique » | https://www.google.com/search?q=cadre+photo+numérique |
| 25 | « machine à café expresso » | https://www.google.com/search?q=machine+à+café+expresso |
| 26 | « nespresso machine » | https://www.google.com/search?q=nespresso+machine |
| 27 | « nespresso machine café » | https://www.google.com/search?q=nespresso+machine+café |

Figure 3:
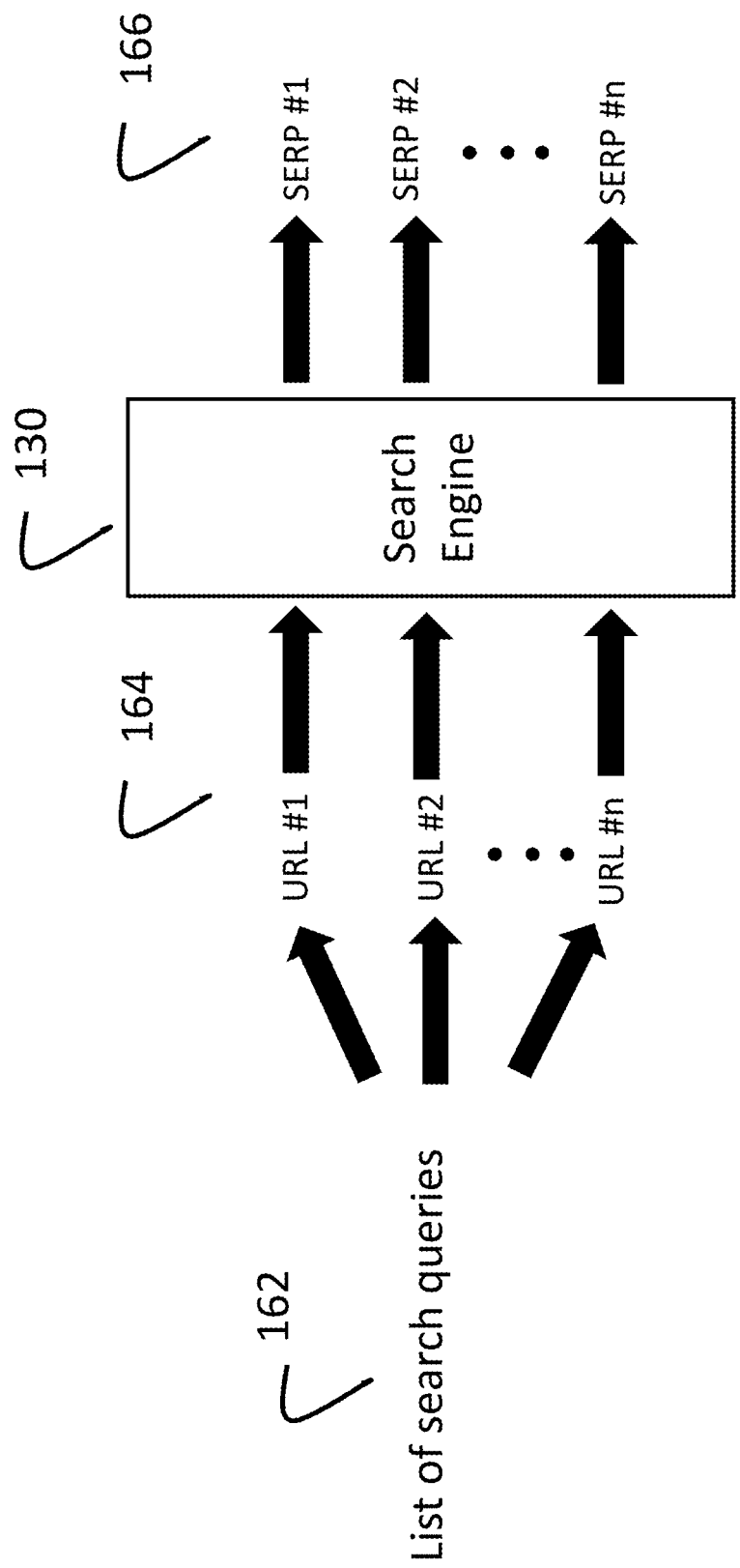

As illustrated in FIG. 3, once the list of search queries 162 is provided to the server 110, the server 110 undertakes to generate a plurality of URLs 164 (i.e., one for each search query as illustrated in Table I). The plurality of URLs 164 are transmitted by the server 110 to the search engine 130 which returns a plurality of SERPs 166 (i.e., one for each search query).

Turning now to FIGS. 4a, 4b, 5a and 5b, a non-limiting example of how information elements are extracted from SERPs is illustrated.

Figure 4A:
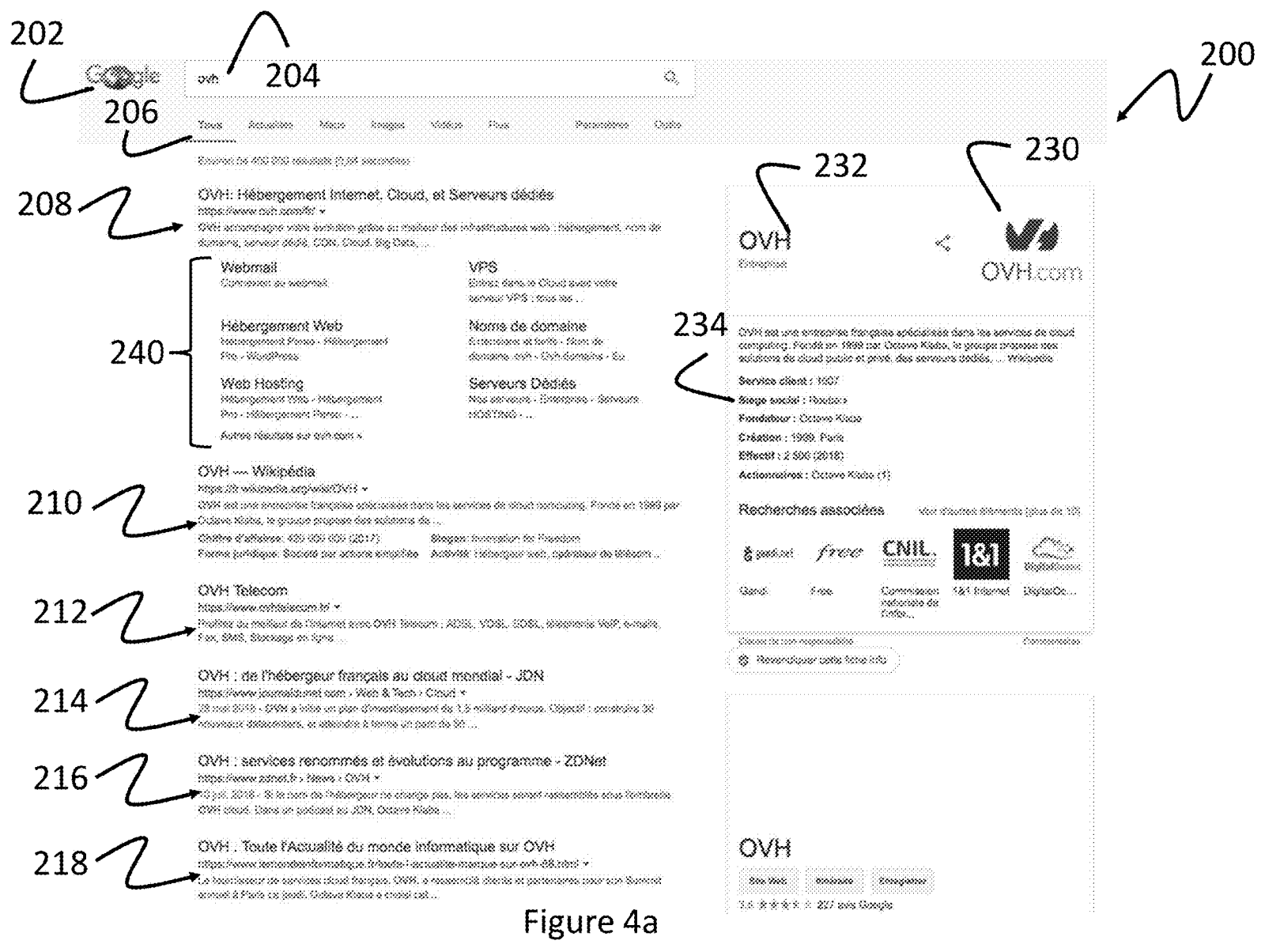
Figure 4B:
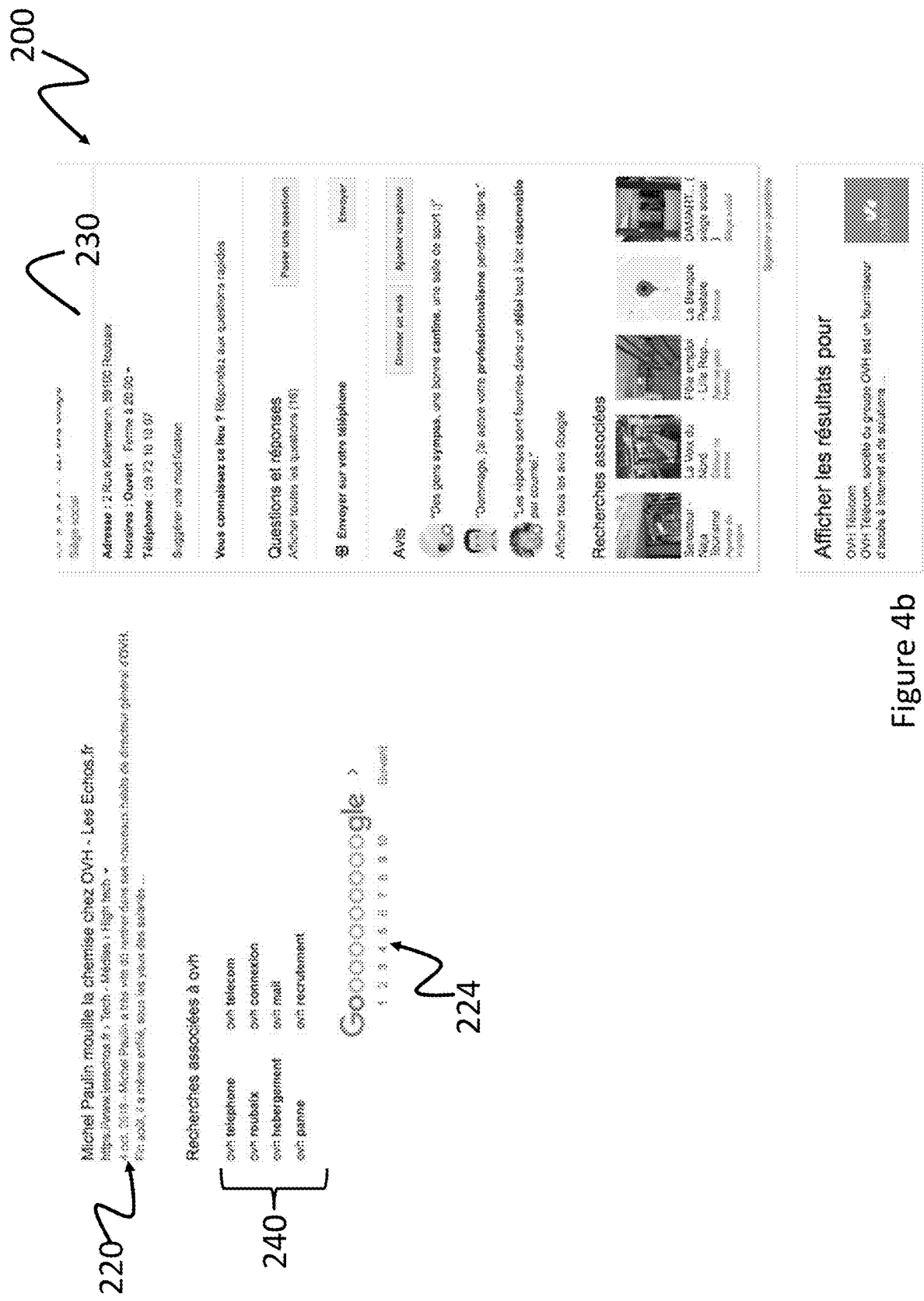

FIGS. 4a and 4b reproduce a content of a first search engine result page (SERP) for a search query. The search query was 'ovh'. The SERP shown on FIGS. 4a and 4b, from top to bottom, was obtained on Oct. 30, 2018 using the Google search engine, by entering the following uniform resource locator (URL) in the address field of an Internet Explorer™ browser: https://google.fr/search?q=ovh.

Figure 5A:
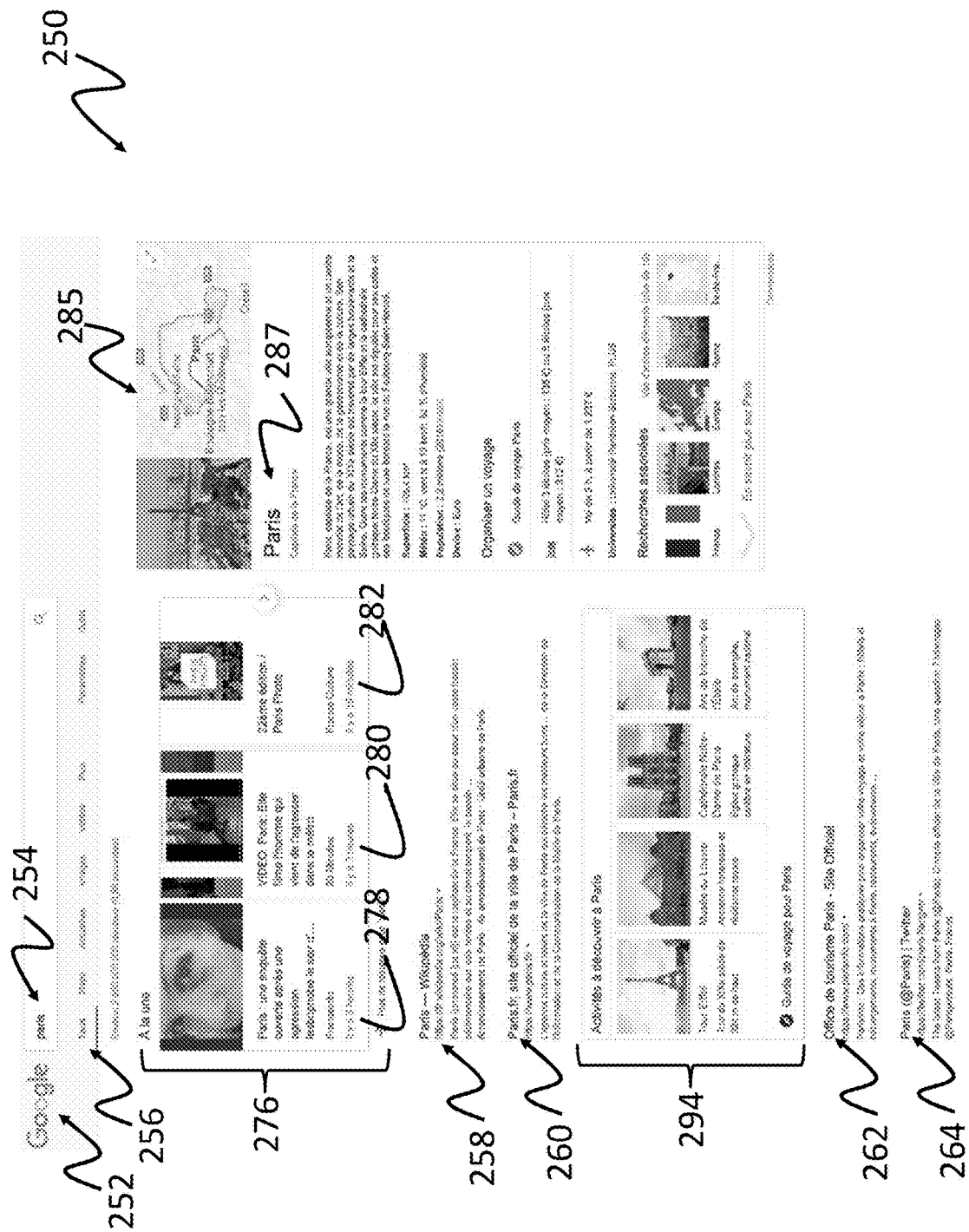
Figure 5B:
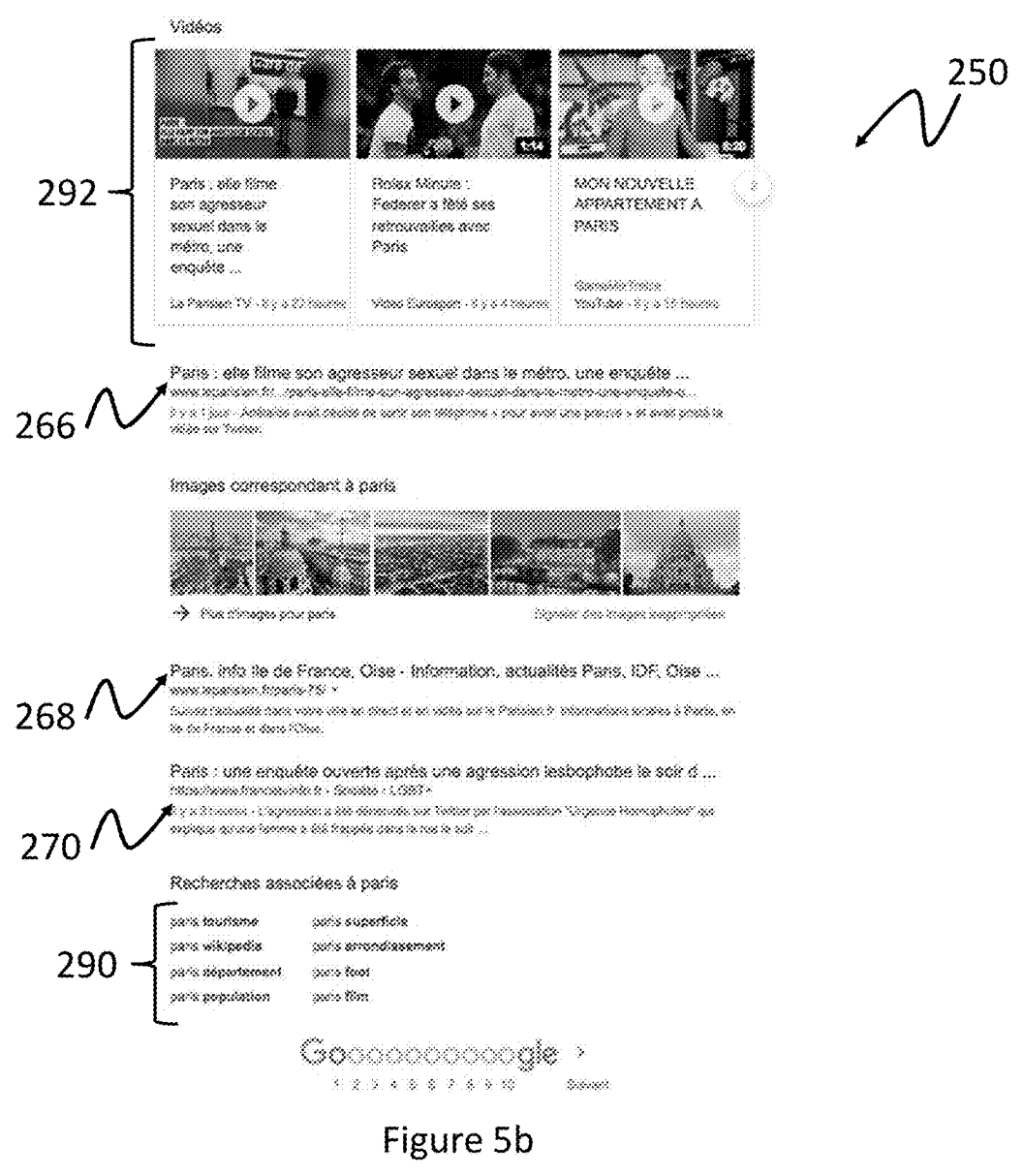

FIGS. 5a and 5b reproduce a content of a second search engine result page (SERP) for another search query. The search query was 'paris'. The SERP shown on FIGS. 5a and 5b, from top to bottom, was obtained on Nov. 2, 2018 using the Google search engine, by entering the following uniform resource locator (URL) in the address field of an Internet Explorer™ browser: https://google.fr/search?q=paris.

Table II shows, in a first column, names of information elements (also referred to as "Parameter") that are extracted from the SERPs of FIGS. 4a, 4b, 5a and 5b. A second column provides values associated with the information elements that have been extracted from the SERP illustrated on FIGS. 4a and 4b. A third column provides values associated with the information elements that have been extracted from the SERP illustrated on FIGS. 5a and 5b.

Several of the values in the second and third columns of Table II are expressed in French, given that the search term is related to a French company and a French city. This does not limit the generality of the present disclosure.

TABLE II

| Parameter | Value (from FIGS. 1a and 1b) | Value (from FIGS. 2a and 2b) | Meaning |
|---|---|---|---|
| query | ovh | paris | Search query |
| serp_url | https://google.fr/search?q=ovh | https://www.google.fr/search?q=paris | URL formed from the search query |
| tabs | Tous Actualités Maps Images Vidéos | Tous Maps Actualités Images Vidéos | List and order to the tabs shown on the SERP |
| tab_1 | Actualités | Maps | Value of the $1^{st}$ tab |
| tab_2 | Maps | Actualités | Value of the $2^{nd}$ tab |
| tab_3 | Images | Images | Value of the $3^{rd}$ tab |
| tab_4 | Vidéos | Vidéos | Value of the $4^{th}$ tab |
| tab_5 | Shopping | Shopping | Value of the $5^{th}$ tab (in the present case, 'Shopping' is the first tab that appears in a drop down list when selecting the 'Plus' tab shown on FIGS. 4a or 5a) |

TABLE II-continued

| Parameter | Value (from FIGS. 1a and 1b) | Value (from FIGS. 2a and 2b) | Meaning |
|---|---|---|---|
| g_adwords | 0 | 0 | Advertising content shown on the SERP |
| g_shopping | 0 | 0 | Links to the Google Shopping site |
| Fresh_results_d | 3 | 1 | Number of results on the SERP showing a date value |
| Fresh_results_h | 0 | 3 | Number results on the SERP showing a time in hours |
| Fresh_results_m | 0 | 1 | Number results on the SERP showing a time in minutes |
| Knowledge_Graph | KnoweldgeGraph OVHEntreprise | Knowledge Graph ParisCapitale de la France | Box appearing on the SERP that shows semantic data about the search query |
| Feature_snippet_text | N/A | N/A | Text extracted from a relevant link and appearing on the SERP |
| Feature_snippet_list | N/A | N/A | Formatting information about the feature snippet |
| Feature_snippet_table | N/A | N/A | As above |
| Google_Onebox_direct_answer | N/A | N/A | Box of the SERP that provides specific information related to the search query |
| Google_Onebox_weather | N/A | N/A | As above |
| Google_Onebox_calculator | N/A | N/A | As above |
| Google_Onebox_translator | N/A | N/A | As above |
| Google_Onebox_sport | N/A | N/A | As above |
| Google_Onebox_hour | N/A | N/A | As above |
| Google_Onebox_convers | N/A | N/A | As above |
| Rich_Snippets_rating | 0 | 0 | Small amount of information shown on the SERP about the search query |
| Rich_Snippets_time | 0 | 0 | As above |
| Rich_Snippets_price | 0 | 0 | As above |
| Wikipedia | 1 | 1 | Presence of a link to a Wikipedia page |
| Youtube | 0 | 0 | Presence of a link to a Youtube page |
| paa_1 | N/A | N/A | 'People also asked' content |
| paa_2 | N/A | N/A | As above |
| paa_3 | N/A | N/A | As above |
| paa_3 | N/A | N/A | As above |
| video_1 | N/A | Paris: elle filme son agresseur sexuel dans le métro, une enquête . . . | Video content of the SERP |
| video_2 | N/A | Rolex Minute: Federer a fêté ses retrouvailles avec Paris | As above |
| video_3 | N/A | MON NOUVELLE APPARTEMENT A PARIS | As above |
| video_4 | N/A | N/A | As above |
| video_5 | N/A | N/A | As above |
| video_6 | N/A | N/A | As above |
| video_7 | N/A | N/A | As above |
| video_8 | N/A | N/A | As above |
| video_9 | N/A | N/A | As above |
| video_10 | N/A | N/A | As above |
| actu_1 | N/A | "Paris: une enquête ouverte après une agression lesbophobe le soir | News content of the SERP |
| actu_2 | N/A | VIDEO. Paris: Elle filme l'homme qui vient de l'agresser dans le métro | As above |

TABLE II-continued

| Parameter | Value (from FIGS. 1a and 1b) | Value (from FIGS. 2a and 2b) | Meaning |
|---|---|---|---|
| actu_3 | N/A | "Ibrahim Maalouf va sortir Live in Paris, enregistré lors de son concert à | As above |
| actu_4 | N/A | N/A | As above |
| actu_5 | N/A | N/A | As above |
| actu_6 | N/A | N/A | As above |
| actu_7 | N/A | N/A | As above |
| actu_8 | N/A | N/A | As above |
| actu_9 | N/A | N/A | As above |
| actu_10 | N/A | N/A | As above |
| local_pack_MyBusiness_1 | N/A | N/A | Information about a site related to the search query on Google's MyBusiness site |
| local_pack_MyBusiness_2 | N/A | N/A | As above |
| local_pack_MyBusiness_3 | N/A | N/A | As above |
| site_links_1 | Webmail | N/A | Additional link appearing on the SERP underneath a main result link |
| site_links_2 | VPS | N/A | As above |
| site_links_3 | Hébergement Web | N/A | As above |
| site_links_4 | Noms de domaine | N/A | As above |
| site_links_5 | Web Hosting | N/A | As above |
| site_links_6 | Serveurs Dédiés | N/A | As above |
| title_1 | OVH: Hébergement Internet, Cloud, et Serveurs dédiés | Paris -Wikipédia | Title of a page appearing on the SERP |
| title_2 | OVH - Wikipédia | Paris.fr, site officiel de la ville de Paris - Paris.fr | As above |
| title_3 | OVH Telecom | Office de tourisme Paris - Site Officiel | As above |
| title_4 | OVH: de l'hébergeur français au cloud mondial - JDN | Paris (@Paris) \| Twitter | As above |
| title_5 | OVH: services renommés et évolutions au programme . . . | Paris: elle filme son agresseur sexuel dans le métro, une enquête . . . | As above |
| title_6 | OVH: Toute l'Actualité du monde informatique sur OVH | Paris, info Ile de France, Oise - Information, actualités Paris, IDF, Oise . . . | As above |
| title_7 | Michel Paulin mouille la chemise chez OVH - Les Echos . . . | Paris: une enquête ouverte après une agression lesbophobe le soir d . . . | As above |
| title_8 | N/A | N/A | As above |
| title_9 | N/A | N/A | As above |
| title_10 | N/A | N/A | As above |
| title_11 | N/A | N/A | As above |
| title_12 | N/A | N/A | As above |
| title_13 | N/A | N/A | As above |
| title_14 | N/A | N/A | As above |
| title_15 | N/A | N/A | As above |
| url_1 | https://www.ovh.com/ca/fr/ | https://fr.wikipedia.org/wiki/Paris | Link (URL) to a page appearing on the SERP |
| url_2 | https://fr.wikipedia.org/wiki/OVH | https://www.paris.fr/ | As above |
| url_3 | https://www.ovhtelecom.fr/ | https://www.parisinfo.com/ | As above |
| url_4 | https://www.journaldunet.com > Web & Tech > Cloud | https://twitter.com/paris?lang=fr | As above |
| url_5 | https://www.zdnet.fr > News > OVH | www.leparisien.fr/ . . . /paris-elle-filme-son-agresseur-sexuel-dans-le-metro-une-enquete-o . . . | As above |
| url_6 | https://www.lemondeinformatique.fr/toute-t-actualite . . . | www.leparisien.fr/paris-75/ | As above |
| url_7 | https://www.lesechos.fr > Tech - Médias > High tech | https://www.francetvinfo.fr > Société > LGBT+ | As above |
| url_8 | N/A | N/A | As above |
| url_9 | N/A | N/A | As above |
| url_10 | N/A | N/A | As above |
| url_11 | N/A | N/A | As above |

TABLE II-continued

| Parameter | Value (from FIGS. 1a and 1b) | Value (from FIGS. 2a and 2b) | Meaning |
|---|---|---|---|
| url_12 | N/A | N/A | As above |
| url_13 | N/A | N/A | As above |
| url_14 | N/A | N/A | As above |
| url_15 | N/A | N/A | As above |
| related_search_1 | ovh telephone | paris tourisme | Suggested queries for additional related searches |
| related_search_2 | ovh roubaix | paris wikipedia | As above |
| related_search_3 | ovh hebergement | paris département | As above |
| related_search_4 | ovh panne | paris population | As above |
| related_search_5 | ovh telecom | paris superficie | As above |
| related_search_6 | ovh connexion | paris arrondissement | As above |
| related_search_7 | ovh mail | paris foot | As above |
| related_search_8 | ovh recrutement | paris film | As above |
| entity | OVH | Paris | Generic name of an entity featured on a web page for the search query |
| entity_type | Entreprise | Capitale de la France | Type for the entity |
| entity_type_mybusiness | Siège social | N/A | As above |
| query_type | N/A | N/A | Field designating a type for the search query |

In Table II, the 'Meaning' column is not actually part of the results obtained from the SERP. The 'Meaning' column is shown in the present disclosure for information purposes. In an implementation, the 'Value' columns of Table II may be repeated for a plurality of distinct search queries. The content of Table II is specific to SERPs obtained using Google. When using another search engine, many similar information elements may be obtained, although some of those information elements will be expressed using distinct names, distinct formats, or distinct languages (particularly in the case of Baidu or Yandex). Some parameters and values of Table II may not be available in SERPs obtained using other search engines; however many parameters used by the present technology are frequently made available by other search engines.

Some of the parameters and values shown on Table II and their relation to the content of FIGS. 4a and 4b will now be described. A SERP 100 shows a logo 202 of the search engine, in the present case 'Google', and a field 204 reproducing the search query, in the present case 'ovh'. This search query is reproduced at the top of Table II, in the second column, followed by the URL used to apply this search query to Google. A row 206 shows various result tabs that respectively read, in the present case 'Tous Actualités Maps Images Vidéos Plus' (equivalently 'All News Maps Images Videos More' for a Google SERP in English). The first of these tabs, 'Tous' (All), indicates that the SERP 200 and the following pages provide links to all Internet web pages found by the search engine. This 'All' tab does not provide any particular information related to the prevalence of content types related to the search query. The following tabs, however, provide an indication of the prevalence of content types for the search query. In the example of FIG. 4a, news content ('Actualités') comes first on the row 206 to indicate that news content is currently very prevalent among the Internet web pages found by the search engine. The prevalence of other content types is, in descending order, maps, images, videos, and various other content types (e.g. shopping, finance, books, flights) listed under the 'Plus' (More) tab. The tabs of row 206, other than the 'Tous' (All) tab and the 'Plus' (More) tab, are listed in the same order as tab_1 to tab_5 in Table II.

Seven (7) links to relevant Internet web pages are listed on the SERP, identified by links 208, 210, 212, 214, 216, 218, 220. The links 208, 210, 212, 214, 216, 218, 220 may also be referred to as organic results of the SERP. Generally, the search engine lists the links in descending relevance order. The SERP indicates in a field 224 (FIG. 4b) that many more links are provided on further pages, still in descending relevance order. An embodiment of the present technology focuses on the first result page. The titles of these seven (7) links 208 to 220 are respectively reproduced as the title_1 to title_7 on Table II. Because the SERP only provides seven (7) links, entries for title_8 to title_15 are left empty, set to a null value or set to not available (N/A) as illustrated on Table II. Addresses of these seven (7) links 208 to 220 are reproduced as the url_1 to url_7 on Table I; url_8 to url_15 are left empty or set to N/A or any other null value.

Among the seven (7) links, links 214, 216 and 230 show publication dates. The Fresh_results_d for the SERP 200 is therefore set to three (3). None of the links show publication times in hours or minutes, so the Fresh_results_h and Fresh_results_m for the SERP 200 are both set to zero (0).

The SERP 200 includes a knowledge graph 230 (the knowledge graph 230 extends over FIGS. 4a and 4b). The knowledge graph provides a generic indication 232 'OVH Entreprise' of the nature of an entity found using the search query 204. This generic indication 232 is inserted in the Knowledge_Graph parameter value.

Other information elements of knowledge graph 230 are also copied into Table II. For example, the generic indication 232 'OVH Entreprise' is used to populate the entity and entity-type fields. The entity_type_mybusiness field is populated with the 'Siege social' value of a field 234.

Six (6) site links 240 are found underneath one of the links provided by the search engine, that is, under the link 208. Titles of these site links are inserted in the site_links_1 to site_links_6 fields of Table II.

A number of related search queries 242 that have recently been applied to the search engine by other users are listed at the bottom of the SERP 200 (FIG. 4b). These related search queries 242 are copied in the related_search_1 to related-search_8 of Table II.

Turning now the third column showing values in relation to the content of FIGS. 5a and 5b, a SERP 250 shows a logo 252 of the search engine, in the present case a different version of the 'Google' logo, and a field 254 reproducing the search query, in the present case 'paris'. This search query is reproduced at the top of Table II, in the third column, followed by the URL used to apply this search query to Google. A row 256 shows various result tabs that respectively read, in the present case 'Tous Maps Actualités Images Vidéos Plus' (equivalently 'All Maps News Images Videos More' for a Google SERP in English). The first of these tabs, 'Tous' (All), indicates that the SERP 250 and the following pages provide links to all Internet web pages found by the search engine. This 'All' tab does not provide any particular information related to the prevalence of content types related to the search query. The following tabs, however, provide an indication of the prevalence of content types for the search query. In the example of FIG. 5b, news content ('Actualites') comes second to Maps on the row 206 to indicate that news content is currently fairly prevalent among the Internet web pages found by the search engine, news content being however less prevalent than maps content. The prevalence of other content types is, in descending order, images, videos, and various other content types (e.g. shopping, finance, books, flights) listed under the 'Plus' (More) tab. The tabs of row 256, other than the 'Tous' (All) tab and the 'Plus' (More) tab, are listed in the same order as tab_1 to tab_5 in Table II.

Seven (7) links to relevant Internet web pages are listed on the SERP, identified by links 258, 260, 262, 264, 266, 268, 270. Generally, the search engine lists these links in descending relevance order. The titles of these seven (7) links 258 to 270 are respectively reproduced as the title_1 to title_7 on Table II. Addresses of these seven (7) links 258 to 270 are reproduced as the url_1 to url_7 on Table II; url_8 to url_15 are left empty or set to N/A or any other null value.

FIG. 5a shows that a 'À la une' box 276 (equivalently a 'Top Stories' box) that includes very fresh news content. Within the box 276, fields 278 and 280 show that news items were published 3 hours ago and a field 282 shows that another news item was published 19 minutes ago. The link 270 shows a publication time in hours and the link 266 shows a publication time in days, i.e. one (1) day ago. In Table II, these information elements are used to populate the 'Fresh_results_d' parameter value, which is set to one (1), the 'Fresh_results_h' parameter value, which is equal to three (3), and the 'Fresh_results_m' parameter value, which is set to 1.

The SERP 250 includes a knowledge graph 285. The knowledge graph provides a generic indication 287 'Paris Capitale de France' of the nature of an entity found using the search query 254. This generic indication 287 is inserted in the Knowledge_Graph parameter value.

Other information elements of knowledge graph 287 are also copied into Table II. For example, the generic indication 287 'Paris Capitale de France' is used to populate the entity and entity-type fields.

A number of related search queries 290 that have recently been applied to the search engine by other users are listed at the bottom of the SERP 250 (FIG. 5b). These related search queries 290 are copied in the related_search_1 to related_search_8 of Table II.

FIG. 5b also shows three (3) linked videos 292. Titles of these videos are shown in the video_1 to video_3 fields of Table II. Image contents 294 are not reflected in Table II and not used in the present implementation.

Result pages obtained when entering other search queries on the same search engine, in this case Google, may have different structures. Some result pages may not contain a knowledge graph or a 'Top Stories' content. Some result pages include other content used to populate fields of Table II that are not part of the SERPs 200 and 250. Such fields may include one or more feature snippets, direct answers from Google, links to videos from Youtube™ or other sites, contents acquired from Wikipedia™, suggestions for other relevant searches identified with labels 'People also asked', news content, and the like.

When the same search queries, in the present case 'ovh' or 'paris', is applied to another search engine, a different SERP will generally show similar content, however presented in a different format, with more or less emphasis on certain results. For example, a SERP from Bing consistently shows result tabs in the same order, which is 'All Images Videos Maps News'. The present technology may be adapted to extract contents from any SERP obtained from any search engine.

It should be understood that Table II has been provided as part of the present disclosure to illustrate, in a format intelligible to human, how information elements may be extracted and used to populate a content matrix. Table II may be deemed to illustrate an example of a content matrix. The example set forth in connection with the description of FIGS. 4a, 4b, 5a, 5b aims at illustrating various examples of extracting information elements from a SERP. In some embodiments, extracting the information elements may be divided in two distinct approaches, namely (1) extracting non-textual content and (2) extracting textual content.

Examples of non-textual content to be extracted from a SERP may include categorical variables. Such categorical variables may include, for example, a presence of a rich snippet, a presence of a knowledge graph, a presence of a result type tab, a presence of an image tab, a presence of a news tab, a configuration of a rich snippet, a configuration of a knowledge graph, a configuration of a result type tab, a configuration of an image tab or a configuration of a news tab. The non-textual content may for example be metadata directly embedded within the SERP. In other instances, the non-textual content may be generated (for example by the server 110) based on a screening of the SERP. Extracting non-textual content allows a more refine assessment of similarity which might otherwise not be as accurate if only textual content were relied upon.

As an example, the non-textual content generated may include generating values (boolean or numerical) defining certain characteristics of elements of the SERP. Examples include a number of news results containing a given time stamp, a number of rich snippets, a number of adwords, an amount associated with an adword, a number of shopping results, an amount associated with a shopping result, a number of result type tabs, an order of result type tabs, a number of image tabs, an order of image tabs, a number of images, a number of news tab or an order of news tab. The generating of the non-textual content may involve determining a type of a variable, transforming text into a factorial variable or transforming text into a document-text matrix. As an example an information element relating to an amount may be extracted from the SERP as being a string of text. A procedure may then be executed to determine that the string of text corresponds to a numerical value and that the format of the information element is to be augmented from textual content to non-textual content (e.g., a numerical value).

As another example, a string of textual content extracted from the SERP may comprise a concatenation of tab tags (e.g., "News, Images, Video") which, once identified, for example by a procedure transforming text into a factorial variable, transforms the string of textual content into metadata relating to tabs such as a number of result type tabs and/or an order of result type tabs. Another example may also involve transforming text into a document-text matrix thereby transforming textual content into non-textual content. Examples of procedures enabling determining a type of a variable, transforming text into a factorial variable or transforming text into a document-text matrix may be implemented in accordance with approaches which may be readily available to the person skilled in the art of the present technology.

Examples of textual content to be extracted from a SERP may include content of organic results, textual content of a rich snippet, textual content a knowledge graph or textual content of a news tab. In some embodiments, extracting textual content from the SERP may involve applying a stemming procedure to text or filtering characters from text in accordance with approaches which may be readily available to the person skilled in the art of the present technology.

Figure 6:
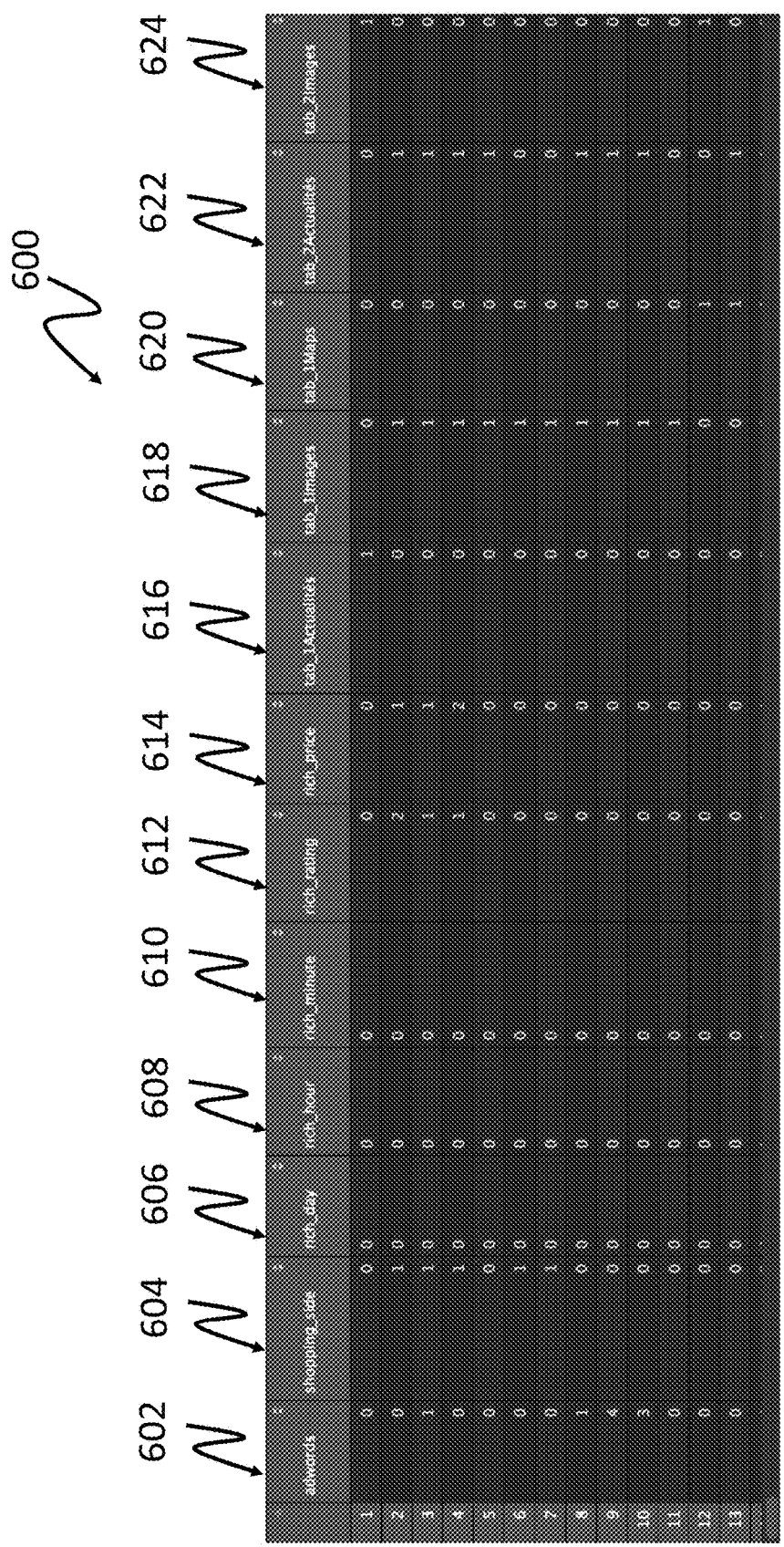
FIG. 6 illustrates a representation of a content matrix in accordance with an embodiment of the present technology.

Turning now to FIG. 6, an example of a content matrix 600 is illustrated. The content matrix 600 is an extract of a larger content matrix which may comprise more lines and/or more columns. The extract aims at illustrating the present technology for the purpose of the present disclosure and should not be construed as being limitative. The content matrix 600 comprises a plurality of lines (e.g., numbered "1" to "13") and a plurality of columns 602, 624. Each line of the plurality of lines is associated with a distinct search query, for example search queries listed as "1" to "13" in the Table I. Each column of the plurality of columns is associated with a distinct category of information elements. As an example, column 602 is associated with a category "adwords" (number of adwords results), column 604 is associated with a category "shopping_side" (number of links to Google shopping), column 606 is associated with a category "rich_day" (number of results comprising temporal information measured in days), column 608 is associated with a category "rich_hour" (number of results comprising temporal information measured in hours), column 610 is associated with a category "rich_minute" (number of results comprising temporal information measured in minutes), column 612 is associated with a category "rich_rating" (number of results associated with rating stars), column 614 is associated with a category "rich_price" (number of results associated with price amounts), column 616 is associated with a category "tab_1Actualités" (boolean identifying whether the result type tab "Actualités" appears first in the list of tabs), column 618 is associated with a category "tab_1Images" (boolean identifying whether the result type tab "Images" appears first in the list of tabs), column 620 is associated with a category "tab_1Maps" (boolean identifying whether the result type tab "Maps" appears first in the list of tabs), column 622 is associated with a category "tab_2Actualités" (boolean identifying whether the result type tab "Actualités" appears second in the list of tabs) and column 624 is associated with a category "tab_2Images" (boolean identifying whether the result type tab "Images" appears second in the list of tabs). As it may be appreciated, certain columns are associated with boolean values while others are associated with numerical values.

As previously explained, the information elements extracted from the SERP are populated into the content matrix. For example, a SERP returned by a search engine in response to a search query is analysed to extract a plurality of information elements which may take the form of multiple values. Each one of the multiple values is then inserted into the line corresponding to the search query and into the column corresponding to the category to which it relates.

As a first example, a search query #3 returns a SERP comprising one (1) adword, one (1) shopping element and comprises "Images" as a first result type tab. As a result of the analyse, the content matrix 600 is populated with a value of "1" in the column 602 (numerical value identifying a number of adword), a value of "1" in the column 604 (numerical value identifying a number of shopping elements) and a value of "1" in the column 618 (boolean value identifying whether the result type tab "Images" is a first tab). The other columns are populated with "0".

As a second example, a search query #9 returns a SERP comprising four (4) adwords and comprises "Images" as a first result type tab. As a result of the analyse, the content matrix 600 is populated with a value of "4" in the column 602 and a value of "1" in the column 618 (boolean value identifying whether the result type tab "Images" is a first tab). The other columns are populated with "0".

Figure 7:
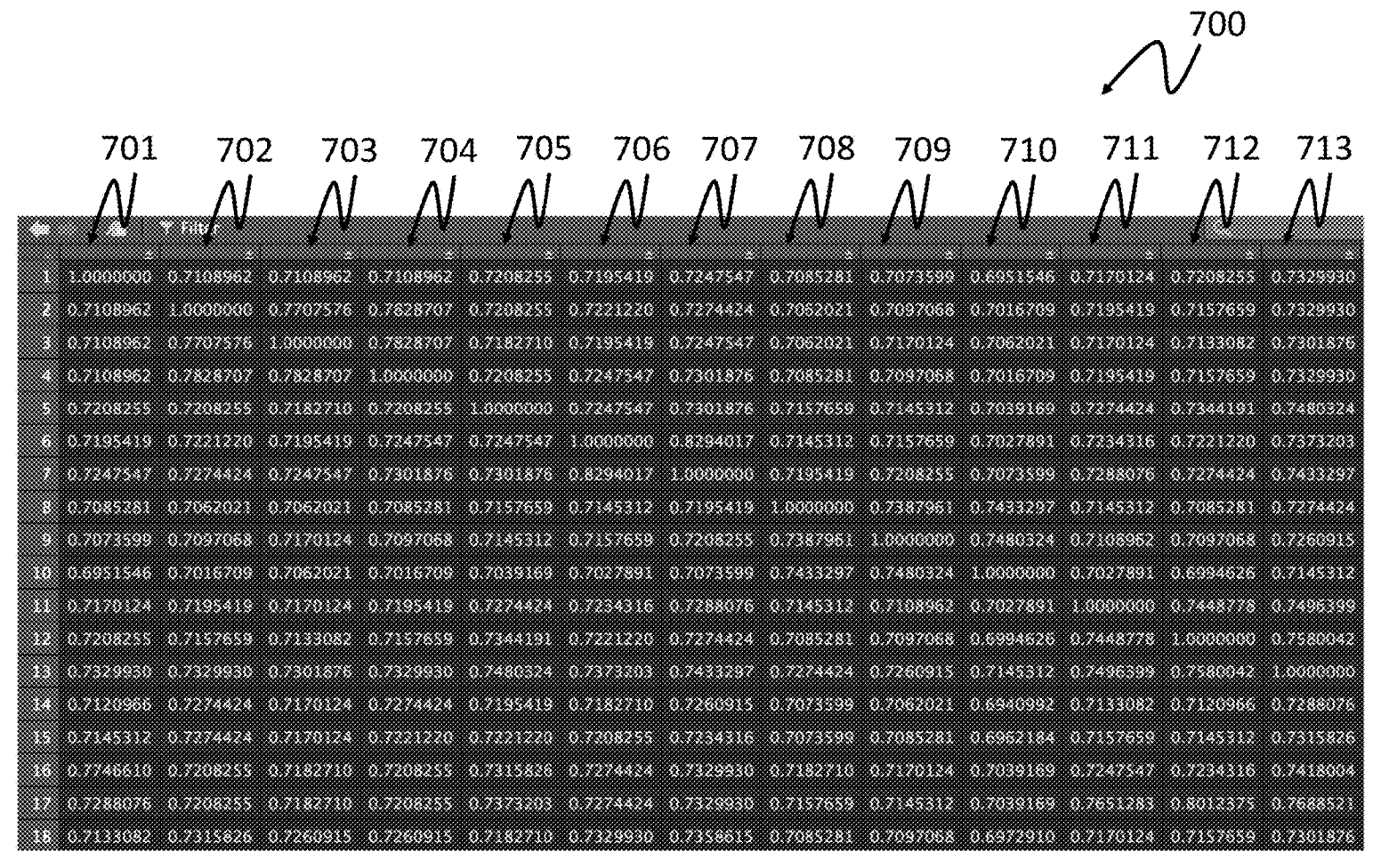

Turning now to FIG. 7, an example of a distance matrix 700 is illustrated. In some embodiments, the distance matrix 700 is computed by applying a similarity learning procedure to the content matrix 600. The similarity learning procedure may be selected so as to generate a similarity score establishing a similarity between each search queries of the search queries. As an example, if the list of search queries comprises twenty four (24) search queries, the similarity learning procedure may compute 24*24=576 similarity scores. As an example, a search query from the list of search queries will be associated with 23 similarity scores measuring the similarity of the search query with all other 23 search queries from the list. In some embodiments, the similarity score ranges from "0" to "1" wherein "0" is associated no similarity while "1" is associated with perfect similarity. As a result, a similarity score closer to "1" may identify a strong similarity between two search queries. This aspect should however not be construed as being limitative and the similarity score may be assessed by a numerical value associated with a different range of values.

In some embodiments, the similarity learning procedure will return a distance matrix such as the distance matrix 700. In the illustrated embodiments, the distance matrix 700 comprises a plurality of lines and a plurality of columns. Each one of the lines is associated with a distinct search query. Each one of the columns is associated with a distinct search query. The distance matrix 700 is symmetrical along a diagonal populated with the value "1". In some embodiments, as the distance matrix may be symmetrical, the number of similarity scores to be computed may be reduced by only computing half of the similarity scores and "projecting" the values along the diagonal of the distance matrix. As an example, line #1 which corresponds to a search query #1 is associated with a series of similarity scores, each measuring a similarity of the search query #1 with the other search queries. As an example, a similarity score of the search query #1 and the search query #2 is "0.7108962" (see line 1, column 702), a similarity score of the search query #1 and the search query #5 is "0.7208255" and so on. In some embodiments, the similarity learning procedure may be implemented using the function "distance matrix computation" from the programming language R supported by the R Foundation for Statistical Computing. Other embodiments of how the similarity learning procedure may be implemented may also be envisioned without departing from the scope of the present technology and will become apparent to the person skilled in the art of the present technology.

Figure 8:
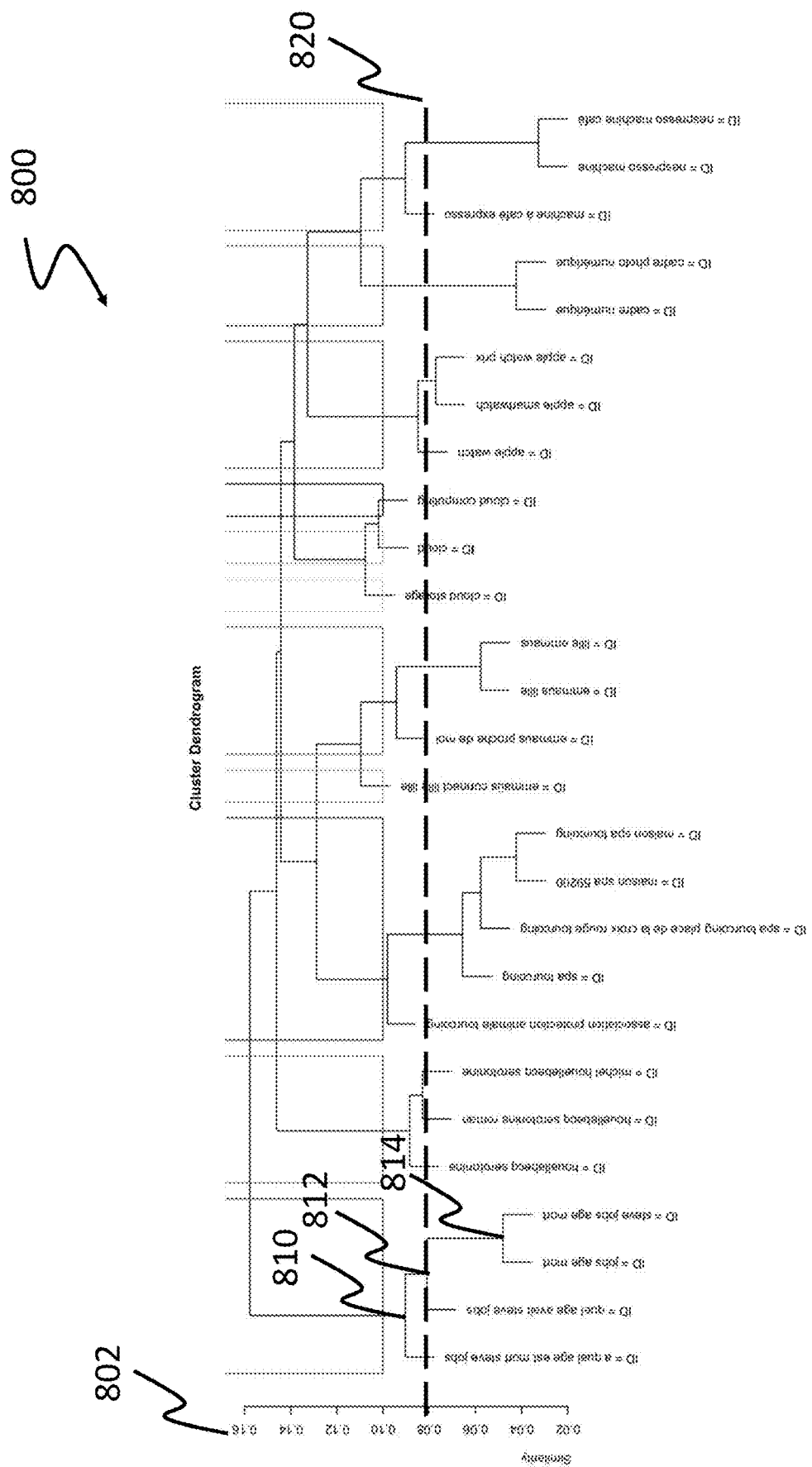
FIG. 8 illustrates a representation of a cluster dendrogram in accordance with an embodiment of the present technology.

Turning now to FIG. 8, an example of a cluster dendrogram 800 is illustrated. In some embodiments, the cluster dendrogram 800 is generated based on a clustering of the search queries. In some embodiments, the clustering is based on the distance matrix (e.g., the distance matrix 700). The clustering may also be based on minimum similarity threshold defining a minimum similarity scores to be met to allow clusterization. In some embodiments, the clustering of search queries may also be referred to as a grouping of search queries having a similarity score meeting a certain threshold.

In some embodiments, a hierarchical clustering procedure is applied to the distance matrix 700 so as to create clusters of search queries based on their respective similarity scores. In some embodiments, the hierarchical clustering procedure may be implemented using the function "hierarchical clustering computation" from the programming language R supported by the R Foundation for Statistical Computing. Other embodiments of how the hierarchical clustering procedure may be implemented may also be envisioned without departing from the scope of the present technology and will become apparent to the person skilled in the art of the present technology.

In the embodiment illustrated at FIG. 8, twenty four (24) search queries have been clustered and represented on the cluster dendrogram 800. The search queries are also associated with a graphical representation positioning the clusters of search queries according to a measurement of a similarity deviation. In the illustrated example, the lower the position of the cluster, the more similarity exists between the search queries. As an example, the search queries "jobs age mort" and "steve jobs age mort" have a stronger similarity than "cloud" and "cloud computing". Also illustrated in the example is a visual representation of a minimum threshold of similarity 820. The minimum threshold of similarity 820 may allow sorting cluster of search queries that meet the minimum threshold of similarity, "0.08" in this example.

As it may also be appreciated from the reading of the dendrogram 800, clusters of search queries may be organised in clusters of sub-clusters. As an example, a first cluster 810 comprises a search query "a quel age est mort steve jobs" and a sub-cluster 812. The sub-cluster 812 comprises a search query "quel age avait steve jobs" and a sub-cluster 814. The sub-cluster 814 comprises a search query "jobs age mort" and a search query "steve jobs age mort".

As it may be appreciated by the person skilled in the art of the present technology, the cluster dendrogram illustrates one format of visual representation of clusters of search queries. Other variations as to how clusters of search queries may be represented may be envisioned without departing from the scope of the present technology.

Figure 9:
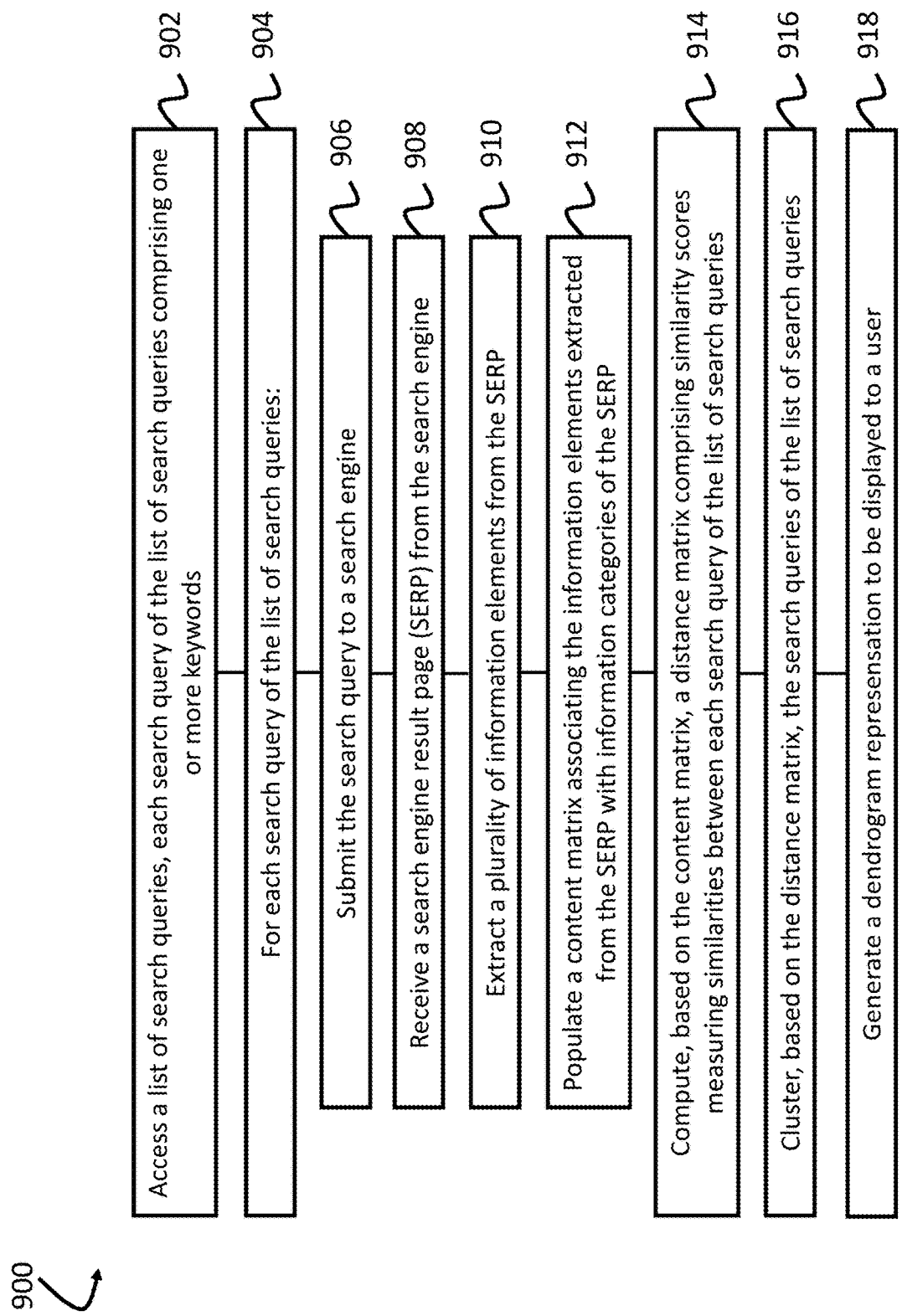
FIG. 9 illustrates a computer-implemented method for clustering search queries in accordance with an embodiment of the present technology.

Turning now to FIG. 9, a flow diagram of a method 900 for clustering search queries according to one or more illustrative aspects of the present technology is disclosed. In one or more embodiments, the method 900 or one or more steps thereof may be performed by one or more computing devices or entities. The method 900 or one or more steps thereof may be embodied in computer-executable instructions that are stored in a computer-readable medium, such as a non-transitory computer-readable medium. Some steps or portions of steps in the flow diagram may be omitted or changed in order.

At step 902, the method 900 executes accessing a list of search queries, each search query of the list of search queries comprising one or more keywords. The list of search queries may be accessed from a memory storing temporarily or permanently the list of search queries, for example after the list has been provided by the operator to the computing device executing the method 900.

Then, the method 900 proceeds to step 904 which executes sub-steps 906, 908, 910, 912 for each one of the search query of the list of search queries. In the illustrated embodiment, the sub-step 906 comprises submitting the search query to a search engine submitting the search query to a search engine. The sub-step 908 comprises receiving a search engine result page (SERP) from the search engine. The sub-step 910 comprises extracting a plurality of information elements from the SERP. In some embodiments, extracting the plurality of information elements from the SERP comprises extracting non-textual content, the non-textual content comprising at least one of a presence of a rich snippet, a presence of a knowledge graph, a presence of a result type tab, a presence of an image tab, a presence of a news tab, a configuration of a rich snippet, a configuration of a knowledge graph, a configuration of a result type tab, a configuration of an image tab or a configuration of a news tab. In some embodiments, extracting the plurality of information elements from the SERP comprises generating non-textual content relating to the information elements, the non-textual content relating to the information elements comprising one of a number of news results containing a given time stamp, a number of rich snippets, a number of adwords, an amount associated with an adword, a number of shopping results, an amount associated with a shopping result, a number of result type tabs, an order of result type tabs, a number of image tabs, a number of images, an order of image tabs, a number of news tab or an order of news tab. In some embodiments, extracting the plurality of information elements from the SERP comprises generating non-textual content relating to the information elements, the non-textual content being generated based on at least one of determining a type of a variable, transforming text into a factorial variable or transforming text into a document-text matrix. In some embodiments, extracting the plurality of information elements from the SERP further comprises extracting textual content, the textual content comprising textual content of organic results, textual content of a rich snippet, textual content a knowledge graph or textual content of a news tab. In some embodiments, extracting textual content comprises applying a stemming procedure to text or filtering characters from text.

The sub-step 912 comprises populating a content matrix with the information elements extracted from the SERP. In some embodiments, populating the content matrix comprises, for each information element extracted from the SERP, inserting a value associated with the information element extracted from the SERP for a given information category. In some embodiments, the value is one of a boolean value and a numerical value and is associated with non-textual content. In some embodiments, the content matrix comprises a plurality of lines and a plurality of columns, each line of the plurality of lines being associated with a distinct search query, each column of the plurality of columns being associated with a distinct information element category and wherein populating the content matrix comprise, inserting a plurality of values each associated with a distinct information element extracted from the SERP.

At step 914, the method 900 proceeds to computing, based on the content matrix, a distance matrix comprising similarity scores measuring similarities between each search query of the list of search queries. In some embodiments, computing the distance matrix comprises applying a similarity learning procedure to the content matrix, the similarity learning procedure being configured to compute a plurality of similarity scores, each one of the similarity score establishing a similarity between one the search queries from the list of search queries and another one of the search queries from the list of search queries.

At step 916, the method 900 proceeds to clustering, based on the distance matrix, the search queries of the list of search queries. In some embodiments, the clustering of the search queries is further based on a minimum similarity threshold. In some embodiments, clustering the search queries of the list of search queries comprises executing a hierarchical clustering procedure on the distance matrix.

At step 918, the method 900 proceeds to generating a dendrogram representation to be displayed to a user, the dendrogram representation being generated based on the clustering of the search queries. In some embodiments, generating a dendrogram representation to be displayed to a user, the dendrogram representation being generated based on the clustering of the search queries. In some embodiments, the dendrogram representation is further generated based on a minimum similarity score of clusters of search queries.

Figure 10:
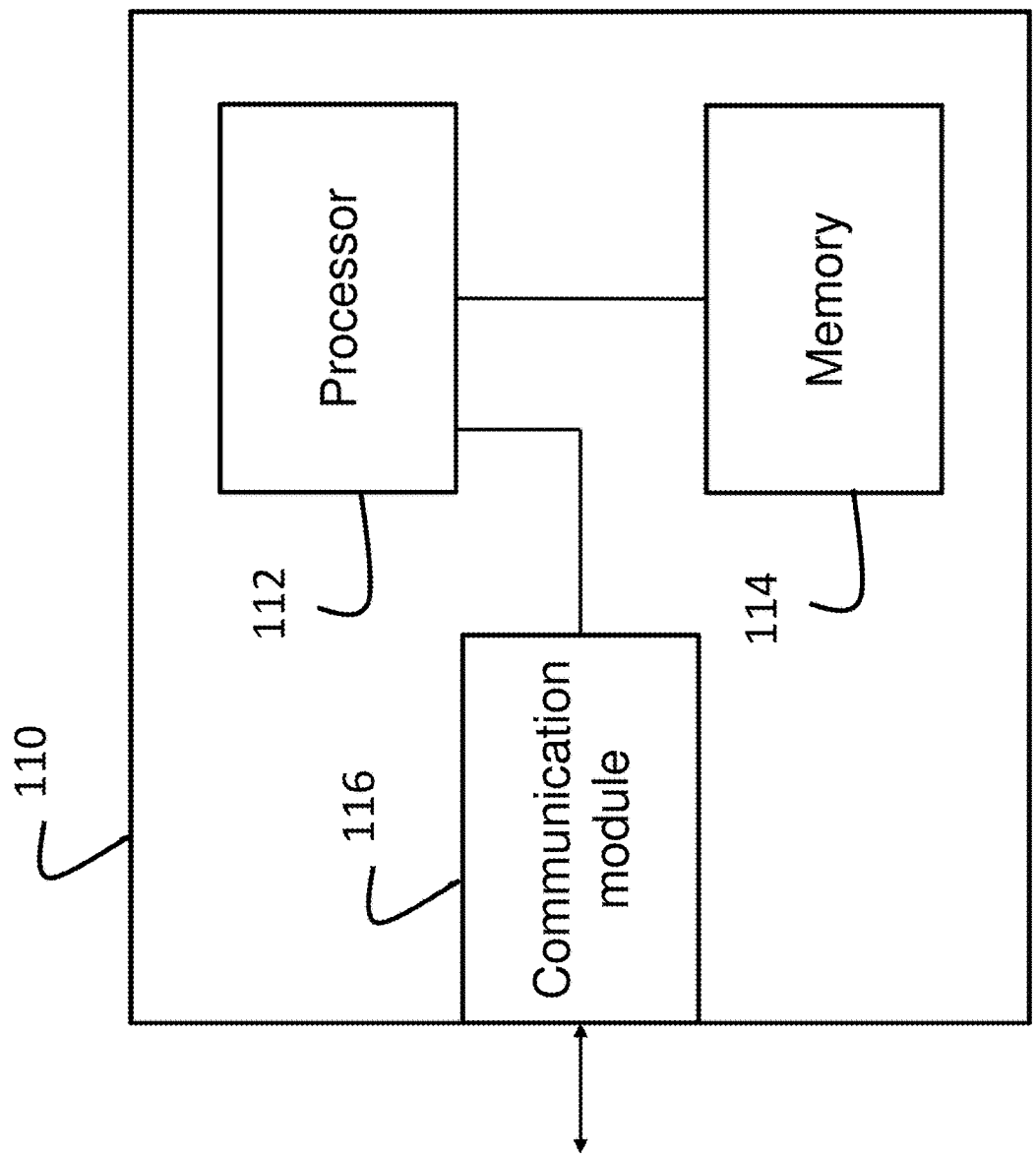
FIG. 10 is a block diagram of a server in accordance with an embodiment of the present technology.

Each step of the method 900 may be configured to be processed by one or more processors, the one or more processors being coupled to a memory device. For example, FIG. 10 is a block diagram of the server 110 in accordance with an embodiment of the present technology. The server 110 comprises the operator interface 118 introduced in the foregoing description of FIG. 1, a processor or a plurality of cooperating processors (represented as a processor 112 for simplicity) operatively connected to a memory device or to a plurality of memory devices (represented as a memory device 114 for simplicity) and to a communication module or a plurality of communication modules (represented as a communication module 116 for simplicity). The communication module 116 is configured for communicating, via the Internet 150, with other network nodes such as the search engine 130 and the Internet users 140. In a variant, the communication module 116 may also communicate via the Internet 150 with a remote operator interface, including for example a computer display with a keyboard and a mouse, a touch sensitive display, and the like, for the benefit of the web site owner. The communication module 116 may be realized as distinct output and input modules for respectively sending and receiving messages over the Internet 150. The memory device 114 is configured to store the list of search queries entered by the operator on the operator interface 118 at the request of the processor 112. The memory device 114 may comprise a non-transitory computer-readable medium for storing instructions that are executable by the processor 112.

In the server 110, the processor 112 is configured to receive, via the operator interface 118, a list of search queries. The processor 112 causes the memory device 114 to store the list of search queries. The processor 112 also causes access, from the memory device 114, to the list of search queries. The processor 112 then causes, for each search query of the list of search queries, to submit, via the communication module 116, the search query to the search engine 130 (see FIG. 3). The processor 112 receives, from the search engine 130 via the communication module 116, a result page (SERP) for each search query of the list of search queries and extracts a plurality of information elements from each SERP. The processor 112 may cause the memory device 114 to store the plurality of information elements from each result page, the information being for example stored in a tabular form as represented by the content matrix 600. For example, the processor 112 may store in the memory device, from the plurality of information elements extracted from a given SERP, a presence of a rich snippet, a presence of a knowledge graph, a presence of a result type tab, a presence of an image tab, a presence of a news tab, a configuration of a rich snippet, a configuration of a knowledge graph, a configuration of a result type tab, a configuration of an image tab or a configuration of a news tab. These examples are non-limiting and the processor 112 may cause the memory device 114 to store any other information elements extracted from each SERP, whether these information elements are visible on the result page or part of hidden metadata.

The processor 112 computes, based on the content matrix, a distance matrix comprising similarity scores measuring similarities between each search query of the list of search queries. Without limitation, the processor 112 may calculate the similarity score based on non-textual content and/or textual content extracted from the SERP.

The processor 112 then clusters, based on the distance matrix, the search queries of the list of search queries. The processor 112 causes the operator interface 118 to output a dendrogram representation to be displayed to a user, the dendrogram representation being generated based on the clustering of the search queries. Other equivalent manners of presenting the clusters of search queries are also part of the present disclosure.

In a variant, the memory device 114 may further comprise a non-transitory computer-readable medium storing executable code thereon. The processor 112 may run instructions contained in the executable code to execute the operations of the method 900.

While the above-described implementations have been described and shown with reference to particular steps performed in a particular order, it will be understood that these steps may be combined, sub-divided, or re-ordered without departing from the teachings of the present technology. At least some of the steps may be executed in parallel or in series. Accordingly, the order and grouping of the steps is not a limitation of the present technology.

It should be expressly understood that not all technical effects mentioned herein need to be enjoyed in each and every embodiment of the present technology.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A computer-implemented method for clustering search queries, the method comprising:
   accessing a list of search queries, each search query of the list of search queries comprising one or more keywords;
   for each search query of the list of search queries:
      submitting the search query to a search engine;
      receiving a search engine result page (SERP) from the search engine;
      extracting a plurality of information elements from the SERP, the extracted information elements comprising embedded metadata details of non-textual content representative of attribute properties of SERP elements;
      populating a content matrix with the information elements extracted from the SERP;
      computing, based on a statistical similarity learning process, a distance matrix of the content matrix entries that generates statistical similarity scores indicating measured similarities between each search query of the list of search queries; and clustering, based on the distance matrix entries, the search queries of the list of search queries.

2. The method of claim 1, wherein the clustering of the search queries is further based on a minimum similarity threshold.

3. The method of claim 1, wherein the embedded metadata details of non-textual content comprises at least one of a presence of a rich snippet, a presence of a knowledge graph, a presence of a result type tab, a presence of an image tab, a presence of a news tab, a configuration of a rich snippet, a configuration of a knowledge graph, a configuration of a result type tab, a configuration of an image tab or a configuration of a news tab.

4. The method of claim 3, wherein the embedded metadata details of non-textual content comprises generating non-textual content relating to the information elements, the non-textual content relating to the information elements comprising one of a number of news results containing a given time stamp, a number of rich snippets, a number of adwords, an amount associated with an adword, a number of shopping results, an amount associated with a shopping result, a number of result type tabs, an order of result type tabs, a number of image tabs, a number of images, an order of image tabs, a number of news tabs or an order of news tabs.

5. The method of claim 1, wherein extracting the plurality of information elements from the SERP further comprises generating non-textual content relating to the information elements based on at least one of determining a type of a variable, transforming text into a factorial variable or transforming text into a document-text matrix.

6. The method of claim 1, wherein extracting the plurality of information elements from the SERP further comprises extracting textual content, the textual content comprising textual content of organic results, textual content of a rich snippet, textual content a knowledge graph or textual content of a news tab.

7. The method of claim 6, wherein extracting textual content comprises applying a stemming procedure to text or filtering characters from text.

8. The method of claim 1, wherein populating the content matrix comprises, for each information element extracted from the SERP, inserting a value associated with the information element extracted from the SERP for a given information category.

9. The method of claim 8, wherein the value is one of a boolean value and a numerical value and is associated with non-textual content.

10. The method of claim 1, wherein the content matrix comprises a plurality of lines and a plurality of columns, each line of the plurality of lines being associated with a distinct search query, each column of the plurality of columns being associated with a distinct information element category and wherein populating the content matrix comprises inserting a plurality of values each associated with a distinct information element extracted from the SERP.

11. The method of claim 1, wherein computing the distance matrix comprises applying a similarity learning procedure to the content matrix, the similarity learning procedure being configured to compute a plurality of similarity scores, each one of the similarity scores establishing a similarity between one of the search queries from the list of search queries and another one of the search queries from the list of search queries.

12. The method of claim 1, wherein clustering the search queries of the list of search queries comprises executing a hierarchical clustering procedure on the distance matrix.

13. The method of claim 1, further comprising generating a dendrogram representation to be displayed to a user, the dendrogram representation being generated based on the clustering of the search queries.

14. The method of claim 13, wherein the dendrogram representation is further generated based on a minimum similarity score of clusters of search queries.

15. A system comprising:
a communication module configured to communicate with a search engine over the Internet;
an operator interface;
a memory device comprising computer-readable instructions; and
a processor operatively connected to the communication module, the operator interface, and the memory device,
in which the processor, upon execution of the computer-readable instructions, causes:
accessing a list of search queries, each search query of the list of search queries comprising one or more keywords;
and for each search query of the list of search queries:
submitting the search query to a search engine;
receiving a search engine result page (SERP) from the search engine;
extracting a plurality of information elements from the SERP, the extracted information elements comprising embedded metadata details of non-textual content representative of attribute properties of SERP elements;
populating a content matrix with the information elements extracted from the SERP;
computing, based on a statistical similarity learning process, a distance matrix of the content matrix entries that generates statistical similarity scores indicating measured similarities between each search query of the list of search queries; and
clustering, based on the distance matrix entries, the search queries of the list of search queries.

16. The system of claim 15, wherein the embedded metadata details of the non-textual content comprises at least one of a presence of a rich snippet, a presence of a knowledge graph, a presence of a result type tab, a presence of an image tab, a presence of a news tab, a configuration of a rich snippet, a configuration of a knowledge graph, a configuration of a result type tab, a configuration of an image tab or a configuration of a news tab.

17. The system of claim 15, wherein populating the content matrix comprises, for each information element extracted from the SERP, inserting a value associated with the information element extracted from the SERP for a given information category.

18. A non-transitory computer readable medium for storing computer-executable instructions that, when executed, cause a computer system to perform a computer-implemented method comprising:
accessing a list of search queries, each search query of the list of search queries comprising one or more keywords;
for each search query of the list of search queries:
submitting the search query to a search engine;
receiving a search engine result page (SERP) from the search engine;
extracting a plurality of information elements from the SERP, the extracted information elements comprising embedded metadata details of non-textual content representative of attribute properties of SERP elements;

populating a content matrix with the information elements extracted from the SERP;

computing, based on a statistical similarity learning process, a distance matrix of the content matrix entries that generates statistical similarity scores indicating measured similarities between each search query of the list of search queries; and clustering, based on the distance matrix entries, the search queries of the list of search queries.

19. The non-transitory computer readable medium of claim 18, wherein the embedded metadata details of the non-textual content comprises at least one of a presence of a rich snippet, a presence of a knowledge graph, a presence of a result type tab, a presence of an image tab, a presence of a news tab, a configuration of a rich snippet, a configuration of a knowledge graph, a configuration of a result type tab, a configuration of an image tab or a configuration of a news tab.

20. The non-transitory computer readable medium of claim 18, wherein populating the content matrix comprises, for each information element extracted from the SERP, inserting a value associated with the information element extracted from the SERP for a given information category.

\* \* \* \* \*